US012044019B2

(12) United States Patent
Sivadjian

(10) Patent No.: US 12,044,019 B2
(45) **Date of Patent: *Jul. 23, 2024**

(54) ADJUSTABLE STAPLE TRACK

(71) Applicant: Luther Sivadjian, Glendale, CA (US)

(72) Inventor: Luther Sivadjian, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,753

(22) Filed: Oct. 2, 2023

(65) Prior Publication Data

US 2024/0102300 A1 Mar. 28, 2024

Related U.S. Application Data

(63) Continuation of application No. 17/954,276, filed on Sep. 27, 2022, now Pat. No. 11,808,049, which is a continuation-in-part of application No. 14/596,597, filed on Jan. 14, 2015, now abandoned.

(51) Int. Cl.
*E04G 21/12* (2006.01)
*B25B 27/14* (2006.01)

(52) U.S. Cl.
CPC .......... *E04G 21/123* (2013.01); *B25B 27/146* (2013.01); *E04G 21/122* (2013.01)

(58) Field of Classification Search
CPC .... E04G 21/122; E04G 21/123; B25B 27/146
See application file for complete search history.

(56) References Cited

U.S. PATENT DOCUMENTS 3,570,739 A * 3/1971 Volkmann ................. B25C 5/16 227/127
3,740,994 A * 6/1973 De Carlo, Jr. ....... A61B 17/128 72/409.05
3,810,495 A * 5/1974 Pack ....................... E04C 5/166 29/818
3,908,884 A * 9/1975 Schrepferman ......... F16B 15/08 227/120
3,945,238 A * 3/1976 Eckert ................... B25B 27/146 72/409.03
3,946,927 A * 3/1976 Fehrs ........................ B25C 5/16 227/126
3,958,738 A * 5/1976 Tremblay ............. B25C 5/1679 227/109
4,050,578 A * 9/1977 Eckert ................... B25B 27/146 206/340
4,296,751 A * 10/1981 Blake, III ............ A61B 17/128 606/143
4,372,316 A * 2/1983 Blake, III ............ A61B 17/128 606/143
4,476,616 A * 10/1984 Jensen .................... F16B 2/248 29/243.56
4,546,528 A * 10/1985 Langas ................... B25C 1/003 227/95
4,712,549 A * 12/1987 Peters ................. A61B 17/128 72/409.05

(Continued)

*Primary Examiner* — Robert F Long
*Assistant Examiner* — Eduardo R Ferrero
(74) *Attorney, Agent, or Firm* — James A. Italia; Italia IP

(57) ABSTRACT

The present disclosure provides kits, apparatuses, adjustable tracks, systems, or processes for fastening elongate objects such as reinforcing bar (rebar) in place either to tack the elongate objects together for subsequent welding, or alternatively, as a final fastener when, for example, the elongate objects are subsequently to be embedded in a material such as concrete.

5 Claims, 49 Drawing Sheets

(56) References Cited

U.S. PATENT DOCUMENTS

| | | | | | |
|---|---|---|---|---|---|
| 4,890,474 | A * | 1/1990 | Agostini | B25B 27/146 | 72/407 |
| 5,020,355 | A * | 6/1991 | Payne | B25B 27/146 | 140/57 |
| 5,297,713 | A * | 3/1994 | Perra | B25C 5/1665 | 227/123 |
| 5,305,628 | A * | 4/1994 | Cluggish | B21F 45/16 | 24/30.5 W |
| 5,566,446 | A * | 10/1996 | Luckhardt | B23P 19/001 | 29/816 |
| 5,613,530 | A * | 3/1997 | Kincel | E04G 21/122 | 140/57 |
| 5,682,806 | A * | 11/1997 | Kretzschmar | B25B 27/146 | 91/170 R |
| 5,881,452 | A * | 3/1999 | Nowell, III | E04G 21/122 | 29/816 |
| 5,913,341 | A * | 6/1999 | Jones | E04G 21/123 | 52/750 |
| 5,934,539 | A * | 8/1999 | Lee | B25C 5/1658 | 227/120 |
| 5,938,099 | A * | 8/1999 | Ciccarelli | B21F 15/06 | 227/19 |
| 6,290,115 | B1 * | 9/2001 | Chen | B25C 1/005 | 221/238 |
| 6,679,299 | B1 * | 1/2004 | Hitchin | F16B 7/044 | 140/57 |
| 7,163,135 | B1 * | 1/2007 | Huang | B25C 1/005 | 227/127 |
| 7,240,818 | B1 * | 7/2007 | Ho | B25C 5/1658 | 227/120 |
| 7,516,532 | B2 * | 4/2009 | Wojcicki | B25C 5/1617 | 227/119 |
| 8,376,204 | B2 * | 2/2013 | Buetow | B25C 1/005 | 227/119 |
| 10,781,007 | B2 * | 9/2020 | Seesing | B65B 13/285 | |
| 11,162,269 | B2 * | 11/2021 | Machida | B65B 13/187 | |
| 11,808,049 | B2 * | 11/2023 | Sivadjian | B25B 27/146 | |
| 2003/0196321 | A1 * | 10/2003 | Edson | E04G 21/122 | 29/810 |
| 2005/0040204 | A1 * | 2/2005 | Chi | B25C 5/1658 | 227/109 |
| 2006/0243340 | A1 * | 11/2006 | Wheeler | B21F 15/00 | 140/57 |
| 2007/0284385 | A1 * | 12/2007 | Carraher | E04G 21/122 | 221/27 |
| 2008/0271406 | A1 * | 11/2008 | Yamamoto | E04G 21/122 | 52/685 |
| 2009/0127312 | A1 * | 5/2009 | Tsai | B25C 5/1644 | 227/129 |
| 2009/0242607 | A1 * | 10/2009 | Liu | B25C 1/005 | 227/120 |
| 2010/0089964 | A1 * | 4/2010 | Chen | B25C 5/1658 | 227/120 |
| 2012/0111916 | A1 * | 5/2012 | Chen | B25C 5/0257 | 227/110 |
| 2013/0221055 | A1 * | 8/2013 | Huang | B25C 5/11 | 227/109 |
| 2014/0026409 | A1 * | 1/2014 | Liu | B25C 5/1617 | 29/811.2 |
| 2014/0352250 | A1 * | 12/2014 | Karabas | E04G 21/122 | 52/712 |
| 2016/0201342 | A1 * | 7/2016 | Sivadjian | E04G 21/122 | 140/93 A |
| 2017/0095916 | A1 * | 4/2017 | Lin | B25C 5/1658 | |
| 2023/0106116 | A1 * | 4/2023 | Sivadjian | E04G 21/122 | 140/93.6 |

* cited by examiner

ADJUSTABLE STAPLE TRACK

CROSS-REFERENCE TO RELATED APPLICATIONS

The present application a Continuation application of U.S. patent application Ser. No. 17/954,276 filed on Sep. 27, 2022, which is a Continuation-in-Part (CIP) application of U.S. patent application Ser. No. 14/596,597, filed on Jan. 14, 2015, the disclosure of both is hereby incorporated by this reference in their entirety.

FIELD OF THE DISCLOSURE

The present disclosure relates to a staple track used with a tool for fastening elongate objects such as reinforcing bar (rebar) in place either to tack the elongate objects together for subsequent welding, or alternatively, as a final fastener when, for example, the elongate objects are subsequently to be embedded in a material such as concrete.

BACKGROUND

Concrete structures are frequently reinforced with rebar. Individual lengths of rebar are typically placed perpendicularly to one another and cross one another to form a reinforcing skeleton made of rebar. Prior to liquid or uncured cementitious material such as concrete being poured into a form with rebar reinforcing structure therein, individual rebars of the skeleton must usually be held in place. This has traditionally been done by wrapping manually bendable wire around a joint where two or more rebars contact or cross one another. Manually fortifying this rebar joint is time consuming. In a large structure such as a large building, manual formation of these rebar joints can make a significant contribution to the overall costs of construction. There exists a need to reduce the amount of time to fabricate rebar joints in rebar skeleton structures.

SUMMARY

The present disclosure addresses the above stated situation by providing a tool and a method to form rebar joints expeditiously. To this end, there is disclosed a tie dispensing tool which causes dispensed ties to partially encircle at least two rods, such as rebars of a rebar joint. The tie installing tool comprises a tie ejector, an anvil which deforms dispensed ties to encircle the at least two crossed rods, and an actuator operable to move the anvil between a deployed position encircling the at least two crossed rods and a released position from which the tool can be disengaged from the at least two crossed rods. The tie ejector may be similar to a staple gun. The anvil may comprise two opposing hinged jaws each having a groove therein for deforming one end of a dispensed tie to encircle the at least two crossed rods. The actuator may include a plunger which is displaced by pressing the tie installing tool against the at least two crossed rods, and a linkage which moves the two opposing hinged jaws between the deployed position and the released position. After dispensed tie is applied to and encircles the at least two crossed rods, the anvil is moved to the released position. The tie dispensing tool may then be disengaged from the at least two crossed rods.

Also provided is a staple track used with a rebar fastener gun apparatus or a kit for assembly of a rebar fastener gun. The apparatus or kit can include a body having a linear actuator disposed therein, the linear actuator activatable by a user through a trigger on the body or a sensor that detects a downward force placed on the body against an object. The apparatus or kit can also include a head capable of being attached or removed from the body. The head can include a base plate, two arms attached to the base plate by way of pivots and capable of partial rotation therearound, the arms defining a hollow channel running therebetween, wherein the arms terminate at jaw portions designed to surround two rebar rods to be joined together, wherein the arms have first and second offset grooves disposed on their inner surfaces and in communication with the hollow channel. The apparatus or kit can include a shaft having a first end designed to attach to an end of the linear actuator and a hammer designed to fit at a second end of the shaft, the hammer having a narrow end designed to mate with the hollow channel running between the two arms, the narrow end of the hammer terminating at a groove running at an offset angle relative to a line w defining the width of the hammer, the hammer groove set at an angle designed to hold a U-shaped staple in a manner where a mechanical force exerted on the hammer by way of the actuator through the shaft feeds a first end of the U-shaped staple through the first offset groove and a second end of the staple through the second offset groove. The apparatus or kit can also include a track designed to hold a set of U-shaped staples and feed the staples through a U-shaped opening in the base plate of the head as a result of a force applied to the set of U-shaped staples. The track can include a frame including an endplate and first and second sides attached to the endplate, an axial shaft extending from the endplate and between the first and second sides, an axial spring surrounding the axial shaft, a first mechanism designed to adjust the distance between the first and second sides, and a second mechanism designed to lock the axial spring in place in a compressed position or unlock the axial spring in an extended position.

Also provided is an adjustable track for holding staples. The adjustable track can include a frame including an endplate and first and second sides attached to the endplate, an axial shaft extending from the endplate and between the first and second sides, an axial spring surrounding the axial shaft, a first mechanism designed to adjust the distance between the first and second sides, the first mechanism including an oblong piece disposed around the axial shaft and in contact with the first and second sides of the frame and designed to rotate and push the first and second sides apart at a distance based upon the orientation of the oblong piece, track members running horizontally on a side of the endplate that receive the first and second sides in a manner where the first and second sides are moveable along the track members, a second mechanism designed to lock the axial spring in place in a compressed position or unlock the axial spring in an extended position, the second mechanism including a bar disposed laterally across and above a width of the track, a block in communication with the bar and surrounding the axial shaft adjacent to an end of the axial spring and moveable along the axial shaft length, a lateral arm disposed on the first or second side of the track having a groove designed to hold the bar when locked, and a pivot allowing the lateral arm to partially rotate therearound such that the arm can be lowered to engage the bar when locked and raised to disengage the arm when unlocked.

Also provided is a system for fastening a joint between two pieces of rebar. The system can include a head replaceable on a staple gun. The head can include a base plate, two arms attached to the base plate by way of pivots and capable of partial rotation therearound, the arms defining a hollow channel running therebetween, wherein the arms terminate at jaw portions designed to surround two rebar rods to be joined together, wherein the arms have first and second offset grooves disposed on their inner surfaces and in communication with the hollow channel. The system can also include a shaft having a first end designed to attach to an end of a linear actuator, a hammer designed to fit at a second end of the shaft, the hammer having a narrow end designed to mate with the hollow channel running between the two arms, the narrow end of the hammer terminating at a groove running at an offset angle relative to a line w defining the width of the hammer, the hammer groove set at an angle designed to hold a U-shaped staple in a manner where a mechanical force exerted on the hammer by way of the linear actuator through the shaft feeds a first end of the U-shaped staple through the first offset groove and a second end of the staple through the second offset groove. The hammer and the two arms can be designed to work cooperatively to apply mechanical force to the U-shaped staple and bend the U-shaped staple into a spiral-shaped knot surrounding two pieces of rebar to fasten a rebar joint.

Also provided is a process for fastening a joint between two pieces of rebar. The process can include advancing a U-shaped tie into a hollow channel defined by first and second arms partially rotating around a pivot and having upper portions above the pivot and lower portions below the pivot which define a pair of jaws, the jaws positioned around the two pieces of rebar to be fastened together, holding a curved portion of the U-shaped tie with a hammer within a groove at a narrowed end of the hammer, the hammer groove running at an offset angle relative to a line defining the width of the hammer, such that the ends of the U-shaped tie are offset at an angle relate to a line defining the width of the hollow channel, driving the hammer by way of a linear actuator into the hollow channel between upper portions of the arms such that the hammer makes direct contact with inner portions of the first and second arms and drives a wedge therebetween causing the arms to partially rotate around pivots such that the upper portions move away from each other and lower portions move closer together around the two pieces of rebar, wherein force from the hammer pushes the U-shaped tie through the hollow channel such that the offset ends of the U-shaped tie enter offset grooves disposed on inner surfaces of the jaws, the first end of the tie entering a first groove on an inner surface of the first arm and a second end of the tie entering a second groove on an inner surface of the second arm, wherein force exerted by the hammer causes straight portions of the U-shaped tie to mechanically bend around curved portions of the first groove and the second groove such that the tie forms a spiral knot around the two pieces of rebar.

Features of the kit, apparatus, adjustable track, system, or process can include the following. The head can include first and second polygonal blocks that have spaces capable of accepting upper ends of the arms, the spaces defined by endwalls that restrict the rotation of the arms around pivots and outward movement of the arms away from base plate. The first and second arms can have opposing edges bent at an angle to provide a triangular space above the jaw portions permitting partial rotation of the arms around pivots and restricting their movement when the opposing edges meet when the jaw portions are in a closed position. The hammer can be designed to makes direct contact with inner surfaces of the arms to create a wedge that forces the arm portions above pivots to move apart and the jaw portions below pivots to move together. The hammer can have an angled surface that terminates at the narrow end of the hammer to form one edge of the hammer groove. The end of the hammer can have a first depth d1 and a second depth d2 running perpendicular to w, wherein d1>d2. The track can include a lateral spring providing tension between first and second sides of the frame. The first mechanism can include an oblong piece disposed around the axial shaft and in contact with the first and second sides of the frame and designed to rotate and push the first and second sides apart at a distance based upon the orientation of the oblong piece, and track members running on a side of the endplate that receive the first and second sides in a manner where the first and second sides are moveable along the track members. The second mechanism can include a bar disposed laterally across and above a width of the track, a block in communication with the bar and surrounding the axial shaft adjacent to an end of the axial spring and moveable along the axial shaft length, a lateral arm disposed on the first or second side of the track having a groove designed to hold the bar when locked, and a pivot allowing the lateral arm to partially rotate therearound such that the arm can be lowered to engage the bar when locked and raised to disengage the arm when unlocked. The kit, apparatus, adjustable track, system, or process can include a horseshoe-shaped member including first and second arms and having a curved wire underneath exerting pressure pushing the first and second arms away from each other to cause a first and second side of the frame to have a distance therebetween exceeding a width of the width of the U-shaped staples. The kit, apparatus, adjustable track, system, or process can further include a set of U-shaped staples designed to fit in the U-shaped opening of the base plate, each staple terminating at first and second ends, each end including an outer surface which is curved and an inner surface which is flat. The kit, apparatus, adjustable track, system, or process can be designed such that no linking member connects the shaft and the two arms of the head. The jaw portions can be designed to move together in a closed position or move away from each other in an open position by way of partial rotation of the arms around the pivots. The hammer and the two arms of the head can be designed to work cooperatively to apply mechanical force to the U-shaped staple and bend the U-shaped staple into a spiral knot without the use of rollers. The straight portions of the U-shaped staples can be mechanically bent when they are pushed into curved portions of the offset grooves of the arms by force provided by the hammer. The adjustable track can include a first tension member attached to the first and second sides and spanning the distance therebetween, the first tension member having a force pulling the first side and second sides together, and a second tension member having a force pushing the first and second sides apart. The first tension member can be a spring, and the second tension member can be a horseshoe-shaped member including first and second arms and having a curved wire underneath exerting pressure pushing the first and second arms away from each other.

It should be understood that the kit, apparatus, adjustable track, system, or process are not to be considered limitations on the invention defined by the claims. The featured kit, apparatus, adjustable track, system, or process can be implemented in one or more ways using one or more features depicted in the drawings, described in the detailed description, and set forth in the claims.

BRIEF DESCRIPTION OF THE DRAWINGS

Various objects, features, and attendant advantages of the present disclosure will become more fully appreciated as the same becomes better understood when considered in conjunction with the accompanying drawings, in which like reference characters designate the same or similar parts throughout the several views, and wherein.

DETAILED DESCRIPTION

Figure 1:
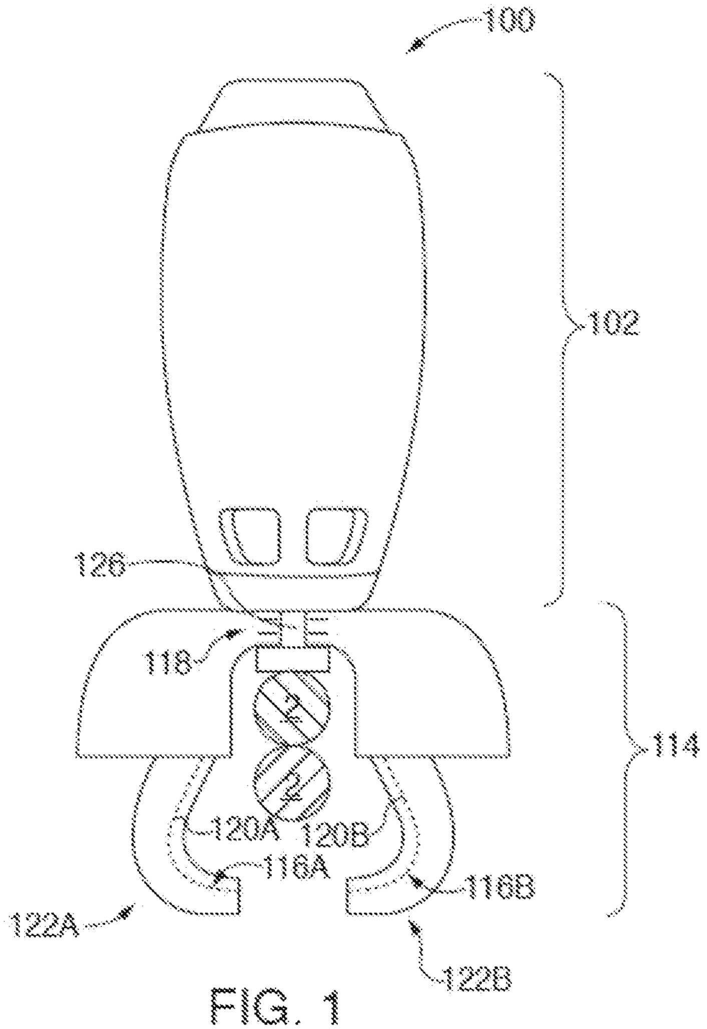
FIG. 1 is a diagrammatic environmental end view of a tie installing tool approaching two crossed rods to be tied together, according to at least one aspect of the disclosure.
Figure 2:
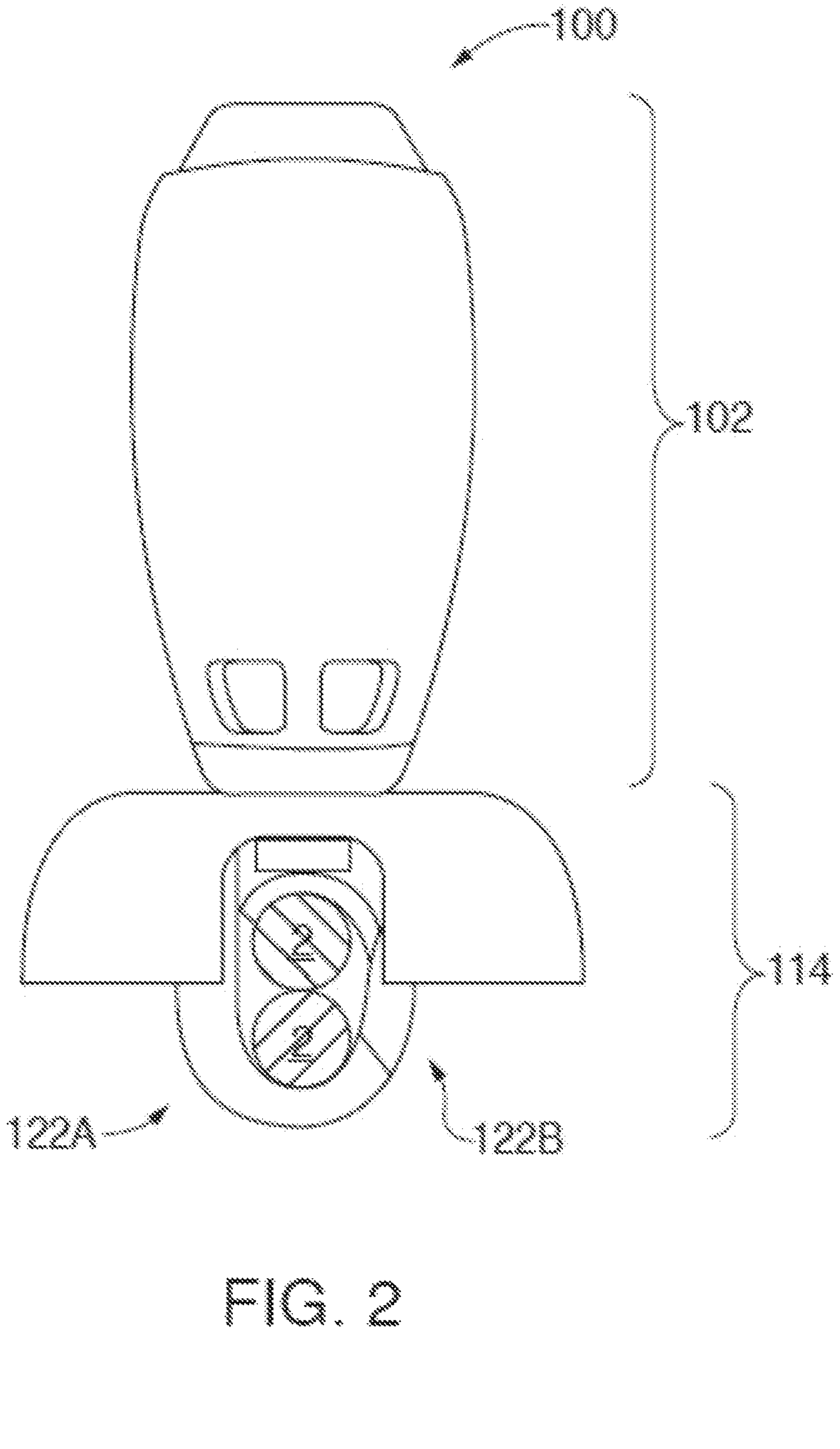
FIG. 2 is a diagrammatic environmental end view of the tie installing tool of FIG. 1, shown closed over and engaging the two crossed rods.
Figure 4:
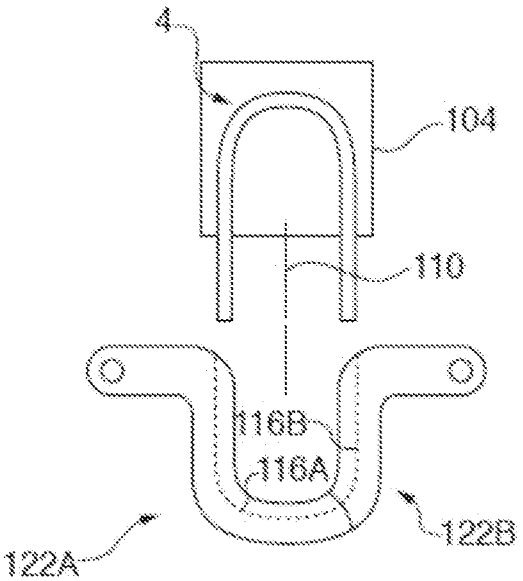
FIG. 4 is a diagrammatic detail view illustrating alignment of ties to be installed with a tie shaping component of the tie installing tool of FIG. 1.
Figure 5:
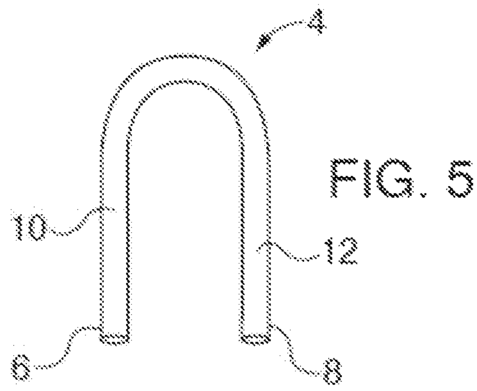
FIG. 5 is a side view of a tie to be installed by the tie installing tool of FIG. 1.

Referring first to FIGS. 1 and 2, according to at least one aspect of the disclosure, there is shown a tie installing tool 100 for tying together at least two crossed rods 2 arranged to be non-parallel and touching one another. Tie installing tool 100 comprises a tie ejector 102 comprising a holder 104 (see FIG. 3) for holding at least one tie 4 (see FIG. 5) having a first end 6 and a second end 8. Tie ejector 108 propels ties 4 from holder 104 along an ejection axis 110 towards the at least two crossed rods 2. Tie installing tool 100 comprises trigger 112 (see FIG. 3) for actuating the tie ejector 102. An anvil assembly 114 is attachably associated with tie ejector 102, comprising a guide surface 116A, 116B movable between a deployed position shown in FIG. 2, wherein the guide surface 116A is linearly aligned with ejection axis 110 of tie ejector 102 (FIG. 4), the anvil assembly 114 partially encircling the at least two crossed rods 2 in the deployed position, and a released position (FIG. 1) enabling the at least two crossed rods 2 to disengage from tie installing tool 100. Guide surface 116A, 116B is configured to deform tie 4 ejected from tie ejector 112 to fully encircle the at least two crossed rods 2. An actuator 118 moves guide surface 116A, 116B from the released position to the deployed position.

Rods 2 may be rebar or other elongate materials which must be mutually joined.

Tie ejector 102 may have structure and function of a pneumatically or electrically powered staple gun (not shown), for example. Trigger 112 controls a motor (not separately shown) to cause tie ejector 102 to eject ties 4.

Figure 3:
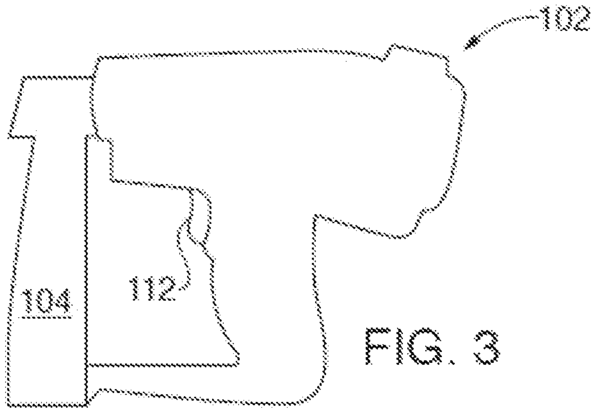
FIG. 3 is a side view of a component shown at the upper portion of FIG. 1.

Ties 4, where tie ejector 102 has structure and function of a staple gun, may be U-shaped staples, as seen in FIG. 3. More particularly, ties 4 may comprise rods which are circular in cross section taken along the length thereof.

Anvil assembly 114 is attachably associated with tie ejector 102 in that it is either removably or permanently attached to tie ejector 102. Where permanently attached to tie ejector 102, tie ejector 2 and anvil assembly 114 may be monolithically formed within a common housing, for example. In the implementation of FIG. 1, anvil assembly 114 is permanently attached to tie ejector 102. In another implementation, anvil assembly 114 is removably attached to tie ejector 102, for example, using threaded fasteners (not shown) to removably join anvil assembly 114 to tie ejector 102.

Anvil assembly 114 comprises a first jaw 122A pivotally mountable to anvil assembly 114 and bearing a first portion 116A of guide surface 116A, 116B, and a second opposed jaw 122B pivotally mountable to anvil assembly 114 and bearing a second portion 116B of the guide surface 116A, 116B. First and second jaws 122A, 122B close over the at least two crossed rods 2 in the deployed position shown in FIG. 2. Also seen in FIG. 2 is that first and second jaws 122A, 122B overlap one another in the deployed position. In FIG. 2, second jaw 122B is partially concealed behind first jaw 122A due to this overlap. In FIG. 2, a portion of first jaw 122A and a portion of second jaw 122B are side by side when overlapping one another.

It should be noted at this point that orientational terms such as above, over, "side by side", and below refer to the subject drawing as viewed by an observer. The drawing figures depict their subject matter in orientations of normal use, which could obviously change with changes in position. Therefore, orientational terms must be understood to provide semantic basis for purposes of description only, and do not imply that their subject matter can be used only in one position.

Figure 6:
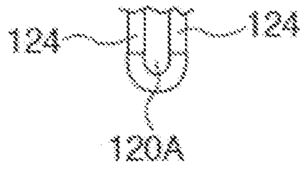
FIG. 6 is a fragmentary detail view of a jaw seen at the lower left of FIG. 1.

Guide surface 116A, 116B is formed in two parts in the implementation of FIG. 1. First jaw 122A has a first groove 120A which defines first portion 116A of the guide surface, receives the first end 6 of a tie 4 being ejected from the tie ejector 102, and deforms a first portion 10 of the tie 4 being ejected to curve around the at least two crossed rods 2. Second jaw 122B has a second groove 120B which defines the second portion 116B of the guide surface 116A, 116B, receives second end 8 of the tie 4 being ejected from tie ejector 102, and deforms a second portion 12 of the tie 4 being ejected to curve around the at least two crossed rods 2. Groove 120A is shown in end view in FIG. 6, groove 120B being similar. Groove 120A is defined between sidewalls 124 so that when a tie 4 enters groove 120A, end 6 is constrained against escape and against resisting deformation as tie 4 is progressively curled as it is ejected from tie ejector 102.

Guide surface 116A, 116B is configured to impart a curl to ties 4 propelled thereagainst by tie ejector 102. With guide surfaces 116A, 116B in the deployed position encircling crossed rods 2 (see FIG. 2), ties 4 will curl around crossed rods 2 when propelled from tie ejector 102.

Figure 7:
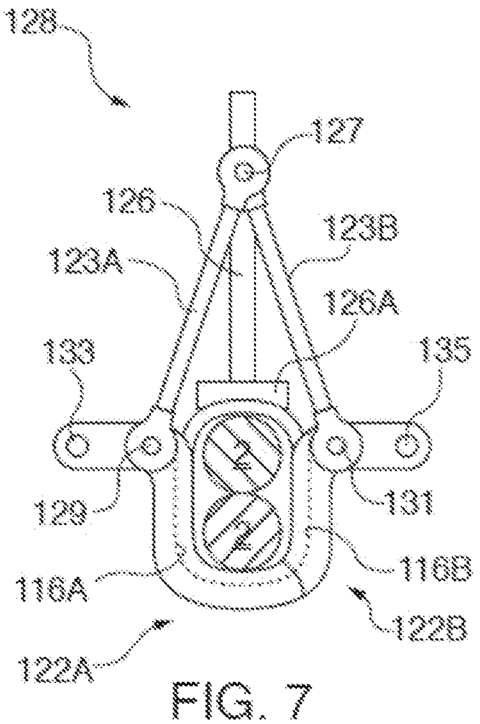
FIG. 7 is a diagrammatic detail view of movable components of the tie installing tool of FIG. 2, showing a deployed position.
Figure 8:
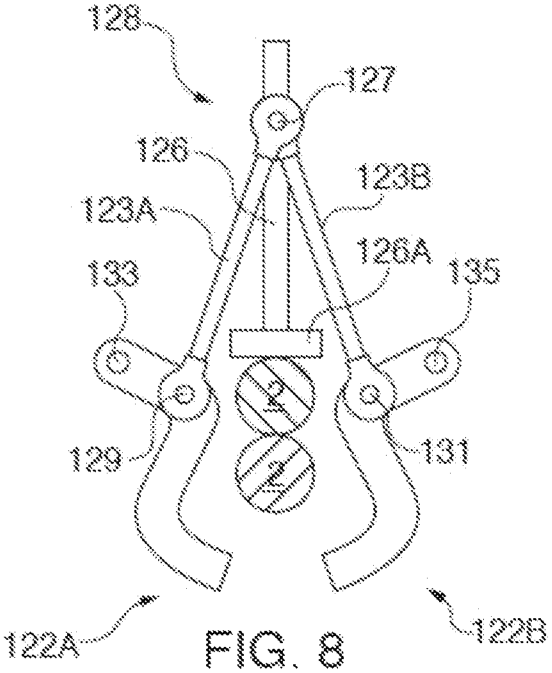
FIG. 8 is a diagrammatic detail view of the components of FIG. 7, but showing a released position.
Figure 13:
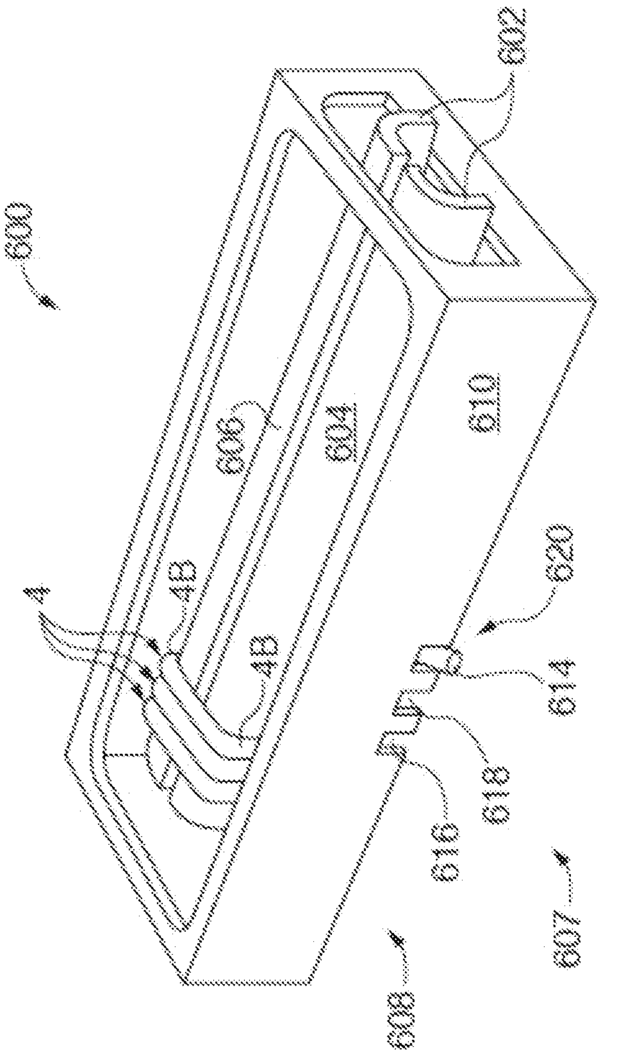
FIG. 13 is a perspective view of a staple magazine exemplary of that shown in FIG. 9.
Figure 14:
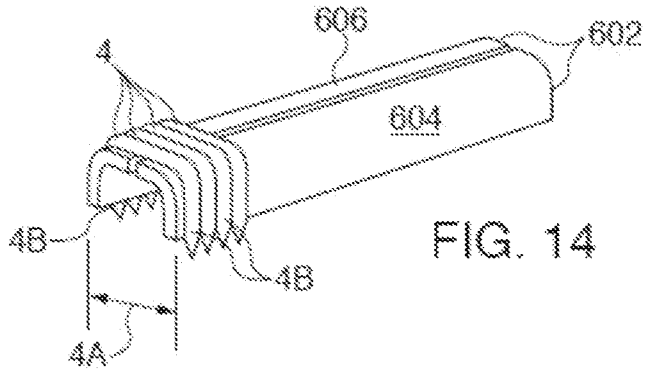
FIG. 14 is a perspective detail view of a central component of the staple magazine of FIG. 13.

Anvil assembly 114 is controlled as follows. Actuator 118 includes a plunger 126 which is displaced relative to tie installing tool 100 when tie installing tool 100 is pressed against at least one of the two crossed rods 2. A linkage 128 is connected to plunger 126, first jaw 122A, and second jaw 122B. Linkage 128 is arranged to move first jaw 122A and second jaw 122B between the deployed position and the released position responsive to plunger 126 being moved along tie installing tool 100. Referring also to FIGS. 7 and 8, plunger 126 is constrained to translate along a path of motion within tie installing tool 100. This translation, transferred to first and second jaws 122A, 122B by linkage rods 123A, 123B, moves first and second jaws 122A, 122B between the deployed position and the released position.

FIGS. 7 and 8 show components of linkage 128 isolated from stationary components of tie installing tool 100. It will be seen in FIGS. 7 and 8 that plunger 126 includes an enlarged head 126A to assure effective contact with rod(s) 2. Linkage rods 123A, 123B engage plunger 126 at a pivot 127 at one end of each linkage rod 123A or 123B. At their opposed ends, linkage rods 123A, 123B respectively engage first and second jaws 122A, 122B at respective pivots 129, 131.

First and second jaws 122A, 122B are pivotally mounted to anvil assembly 114 at respective pivots 133, 135. Pivots 133, 135 are not shown in their entireties, but will be understood to include a pivot axle fixed within the housing of anvil assembly 114.

When plunger 126 is displaced upwardly from the released position shown in FIGS. 1 and 8, it translates to the deployed position shown in FIGS. 2 and 7, exerting pulling forces on linkage rods 123A, 123B. Responsively, linkage rods 123A, 123B draw first and second jaws 122A, 122B from the released position of FIGS. 1 and 8 to the deployed position of FIGS. 2 and 7, even as tie installing tool is pressed downwardly (as illustrated herein) against rods 2.

Figure 9:
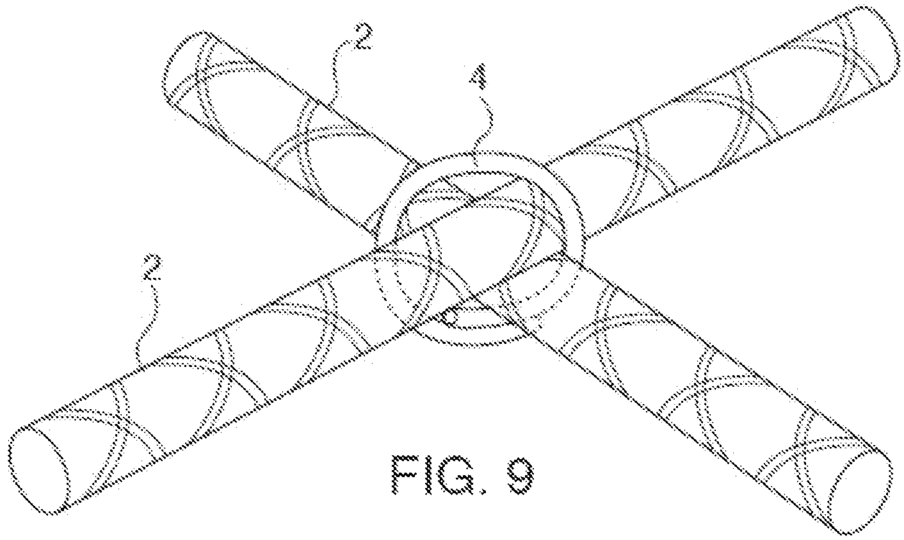
FIG. 9 is a perspective view of two rods tied together by the tie installing tool of FIG. 1.
Figure 10:
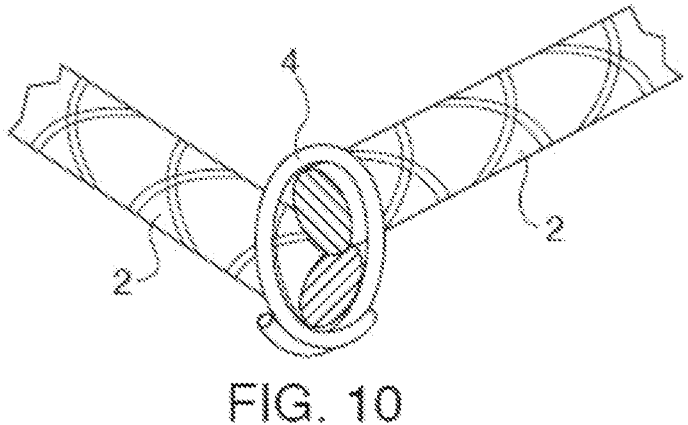
FIG. 10 is a broken away view similar to FIG. 9, but taken at a different angle.

When trigger 112 is pulled, a tie 4 is ejected and formed in the guide surface 116A, 116B. This results in tie 4 encircling the two crossed rods 2. FIGS. 9 and 10 show the tied joint of rods 2. If desired, a second tie 4 may be installed around the tied joint at about a right angle to the tie 4 seen installed in FIGS. 9 and 10.

Figure 11:
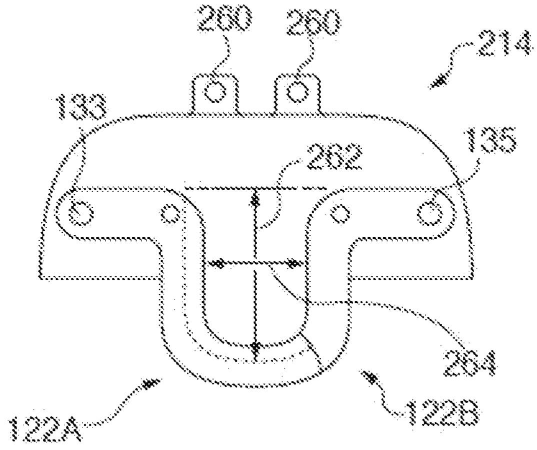
FIG. 11 is a diagrammatic side view of an alternative to a component seen toward the bottom of FIG. 1.
Figure 12:
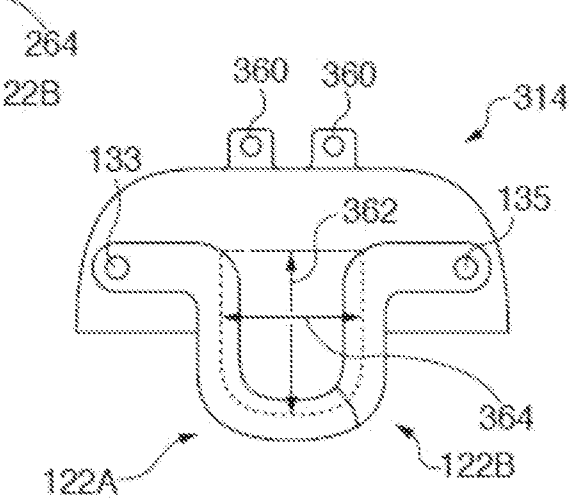
FIG. 12 is a diagrammatic side of an alternative to the component of FIG. 11.

Turning to FIGS. 11 and 12, anvil assemblies 214, 314 are generally structurally and functionally similar to anvil assembly 114 of FIG. 1, with the exception that anvil assemblies 214, 314 include bolt holes 260 or 360 for expeditious attachment to and removal from tie ejector 102, and may have different dimensions. Anvil assembly 214 is a first anvil assembly and is removably mountable to tie installing tool 100. First anvil assembly 214 has first capacity dimensions (represented by arrow 262). Tie installing tool 100 may comprise at least one second anvil assembly 314 having second capacity dimensions (represented by arrow 366) different from the first capacity dimensions of first anvil assembly 214. Width of anvil assemblies 214, 314 (widths indicated by respective arrows 264, 364) may be varied by the manufacturer of tie installing tool 100 if desired.

First and second anvil assemblies 214, 314 are replaceable on tie ejector 102 so that different numbers of rods 2, or different dimensions of rods 2 can be accommodated in that ties 4 may be applied and have a close fit with ties 4 arising from curl imparted by anvil assemblies (e.g., anvil assemblies 114, 214, 314). This allows tie installing tool 100 to apply ties to different rod joints without requiring a different tie installing tool 100 for different joint dimensions. Rather, an appropriately dimensioned anvil assembly 214 or 314 must be attached to tie ejector 102 to result in a functional tool for installing ties to different sized rod joints. Although two removable anvil assemblies 214, 314 are illustrated, it will be understood that additional larger, smaller, taller, or wider anvil assemblies (not shown) may be provided to extend versatility of tie installing tool 100.

Figure 21:
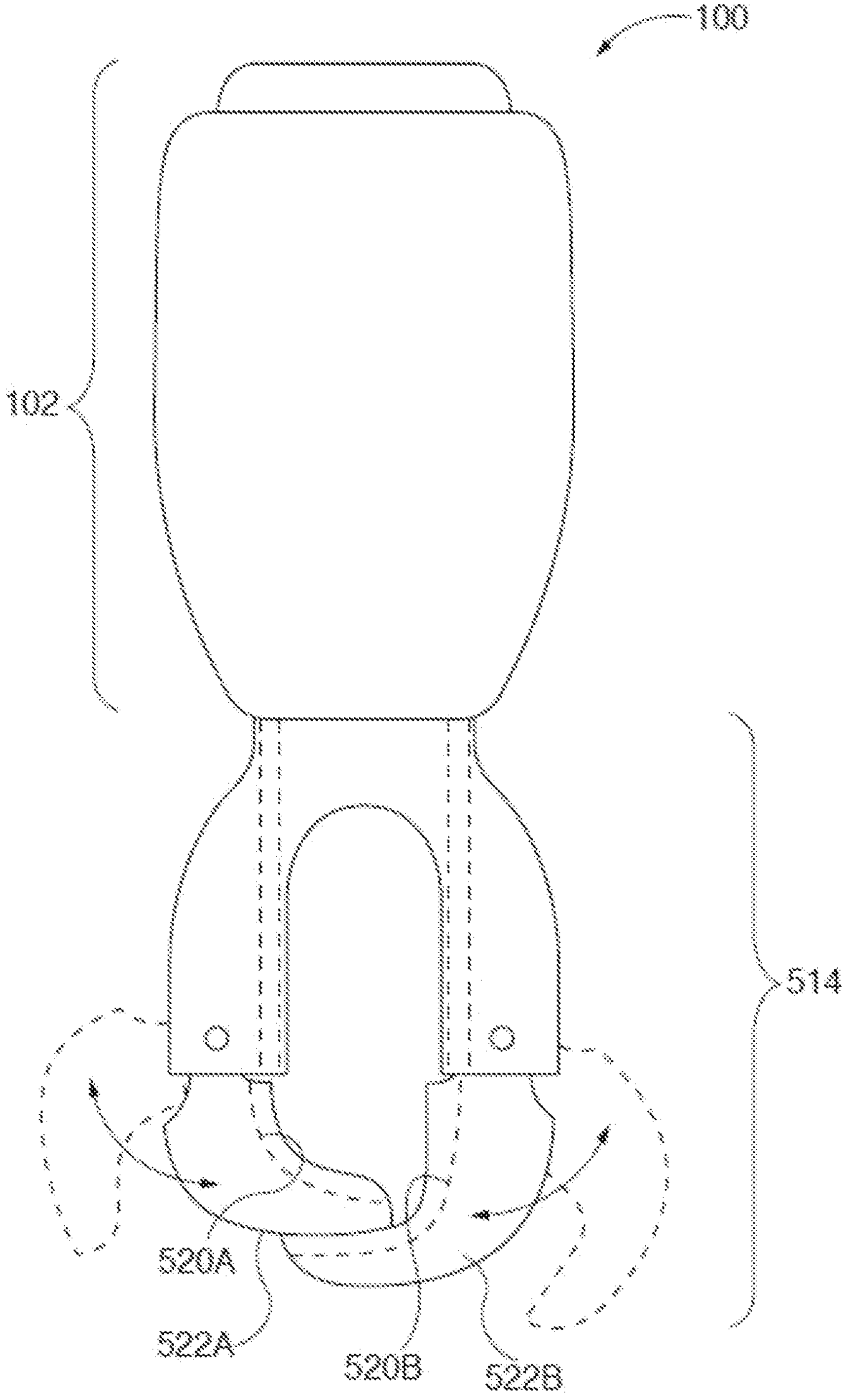
FIG. 21 is a diagrammatic end view of a tie installing tool, according to at least one further aspect of the disclosure.
Figure 22:
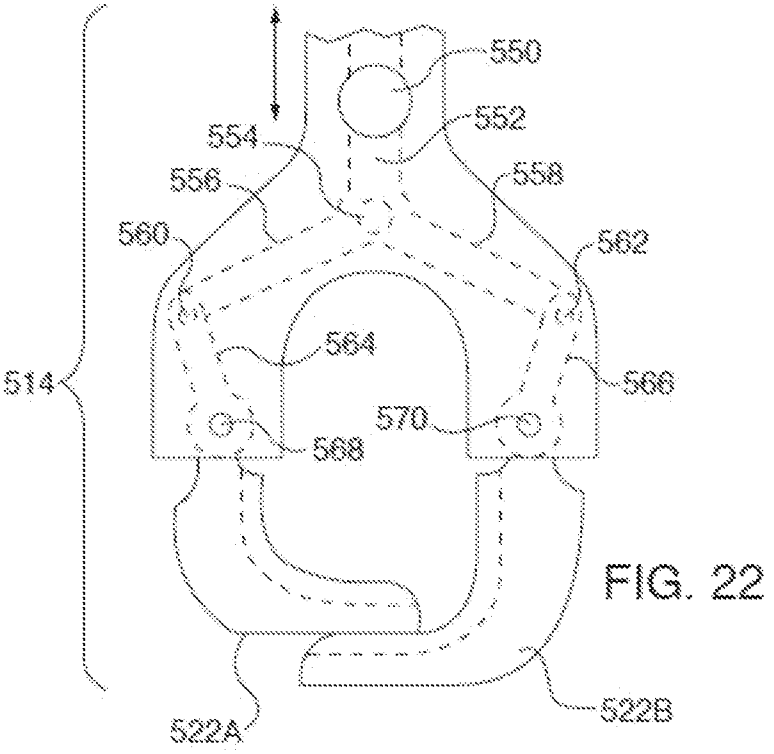
FIG. 22 is a detail view of the bottom of FIG. 21, showing internal components.
Figure 23:
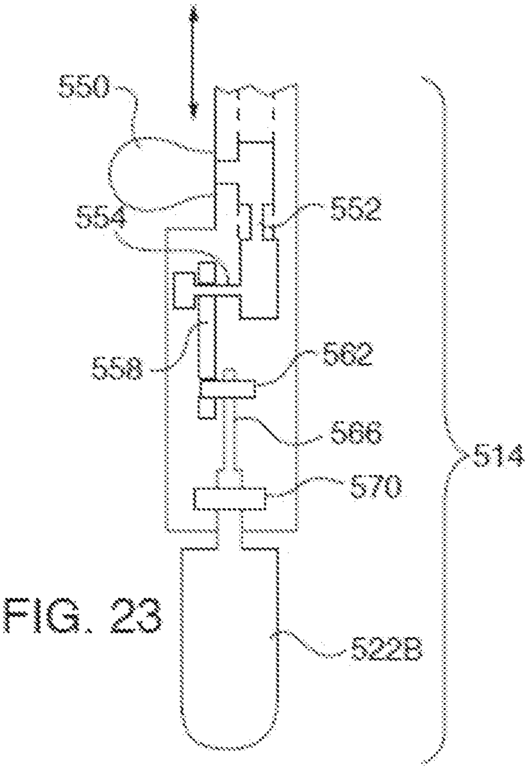
FIG. 23 is a side view of FIG. 22.
Figure 24:
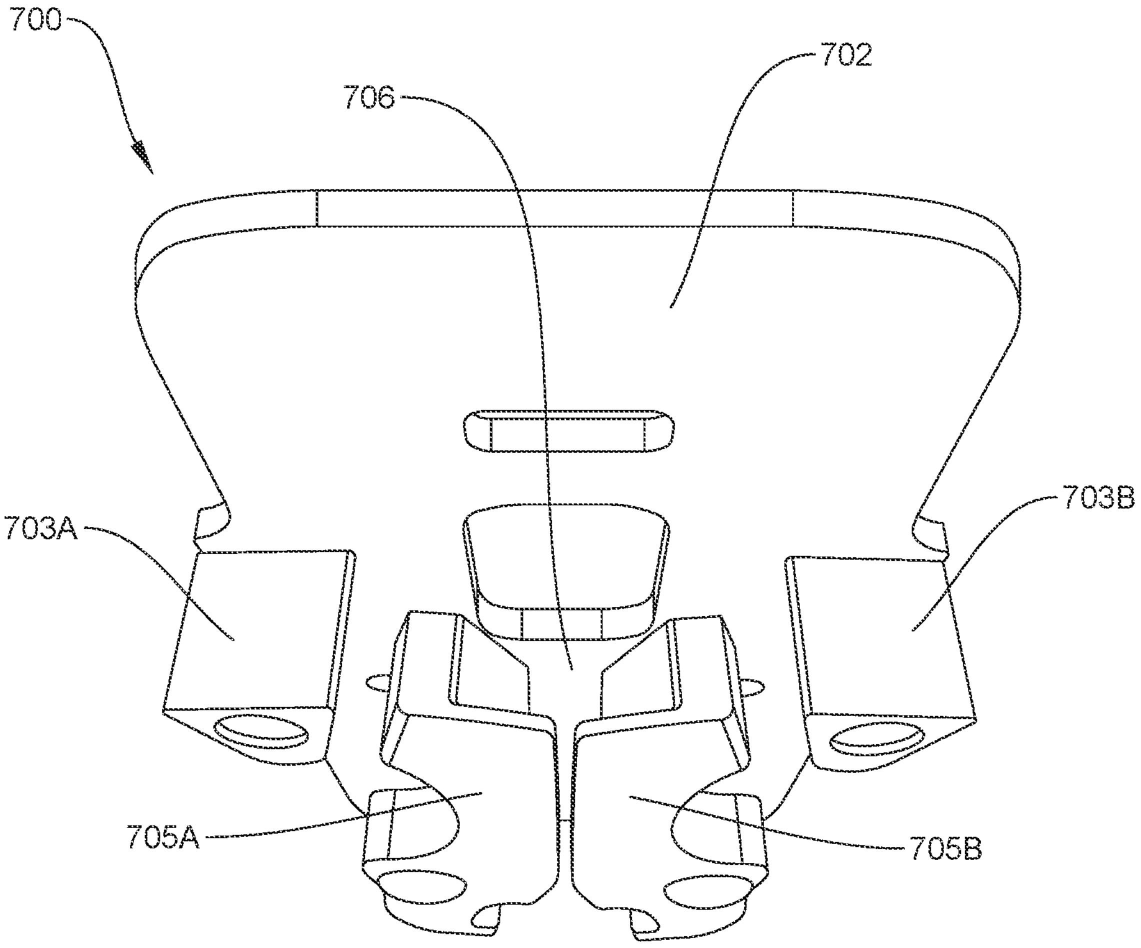
FIGS. 24-29 are images of a replaceable head according to one implementation, with FIGS. 24-26 representing a top, front views, FIG. 27 representing a front, oblique view, and FIGS. 28-29 representing back views.
Figure 25:
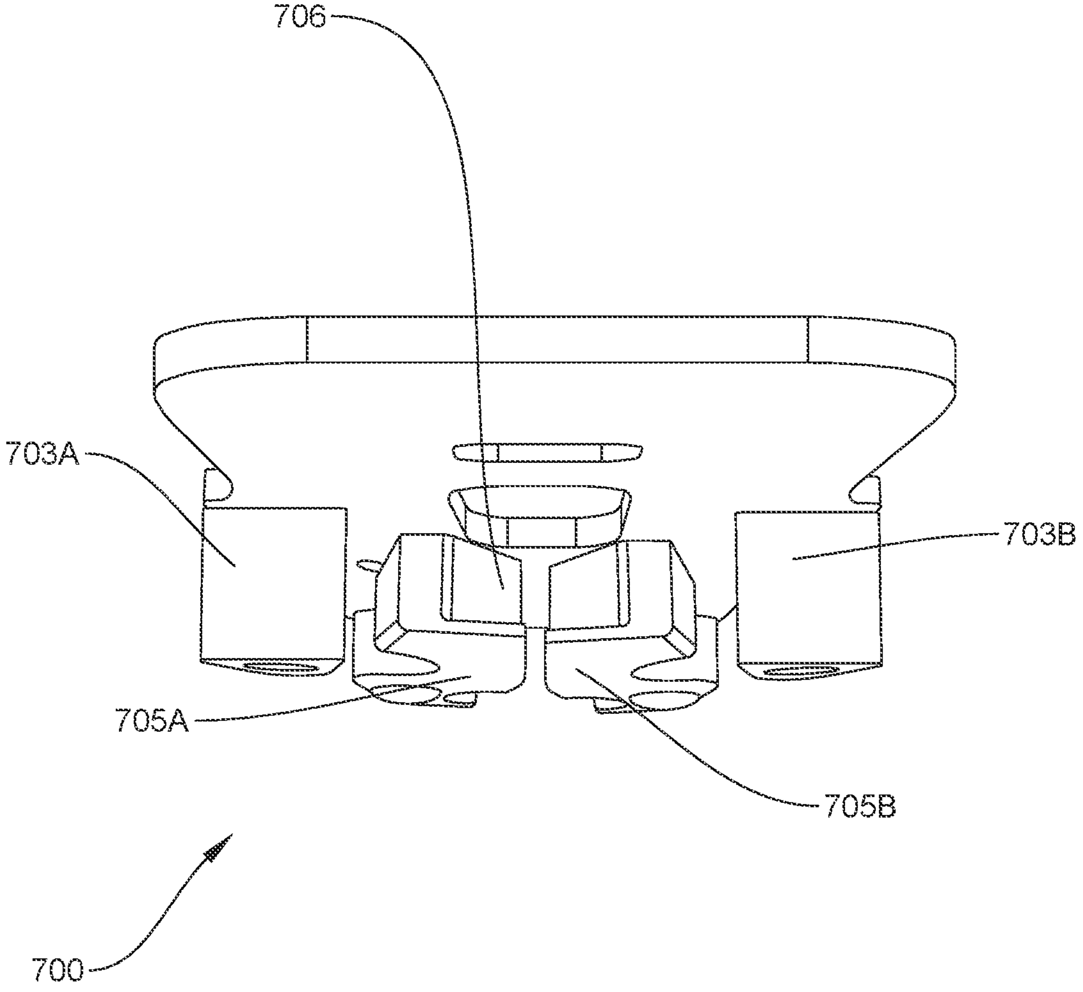

FIGS. 21, 22, and 23 show a tie installing tool 100 comprising a tie ejector 102 and an anvil assembly 514 attachably associated with tie ejector 102 (FIG. 1). Anvil assembly 114 may partially encircle the at least two crossed rods 2 in a deployed position, and may assume a released position (similar to that depicted in FIG. 1) enabling the at least two crossed rods 2 to disengage from tie installing tool 100. The difference between FIG. 1 and FIG. 21 is that in FIG. 21, jaws 522A, 522B of anvil assembly 514 are arranged such that jaw 522A overlies jaw 522B in the deployed position. By contrast, in FIG. 1, corresponding jaws 122A, 122B are side by side relative to one another (as seen in FIG. 2). In tie installing tool 100 of FIG. 21, grooves 520A, 520B need not be offset from one another, as occurs in the tie installing tool 100 of FIG. 1.

FIGS. 22 and 23 show an exemplary arrangement of arms and pivots enabling opening and closing of jaws 522A, 522B. A manual knob 550 is fixed to an arm 552, which arm 552 can translate upwardly and downwardly, as indicated by arrow A in FIG. 22. Responsively to upward and downward translation of arm 552, arms 556 and 558 pull or push on arms 564, 566. Arms 556, 558 are linked to arm 552 at a pivot pin 554. Pivot pin 554 and arms 556, 558 are not anchored to anvil assembly 514. Pivot pins 568, 570 are journaled within or otherwise supported to anvil assembly 514, so that jaws 522A and 522B, and their respective integral arms 564 and 566 pivot about pivot pins 568, 570. In summary, when knob 550 is pulled upwardly, as seen in FIGS. 22 and 23, arm 552 translates upwardly; arms 556, 558 are drawn such that pins 560, 562 are drawn in the direction of the center of FIG. 22; and jaws 522A, 522B spread apart to the position shown in dashed lines in FIG. 21. A spring (not shown) may be provided to urge jaws 522A, 522B into either the deployed position shown in FIG. 22 or the released position shown in dashed lines in FIG. 21.

In FIGS. 21 and 22, a portion of first jaw 522A and a portion of second jaw 522B are side by side when overlapping one another in the deployed position.

Referring to FIGS. 13-20, there is shown a magazine 600 for holding staples 4, wherein magazine 600 is adjustable to accommodate staples 4 of different widths. As employed herein, width of a staple refers to a distance 4A spanning the outermost opposed surfaces of the two legs 4B of staple 4.

Magazine 600 comprises a staple bed 602 formed in two sections 604, 606, and a spreading mechanism 607 (FIGS. 15, 17, 19) which is adjustable to vary distance between the two sections 604, 606. Spreading mechanism 607 may comprise a cam 612 which contacts and spreads the two sections 604, 606 apart, and a lever 614 accessible to finger access from outside magazine 600. Staple bed 602 conforms to the inner contour of staples 4, so that staples 4 can rest in close cooperation with staple bed 602, but can slide therealong. Ordinarily, a spring device (not shown) is provided to advance staples 4 towards the discharge end 608 of magazine 600 as staples 4 are ejected when tie installing tool 100 is used.

Figure 15:
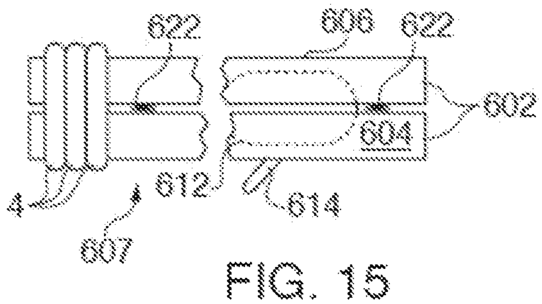
FIG. 15 is a top plan detail view of the component of FIG. 14.
Figure 16:
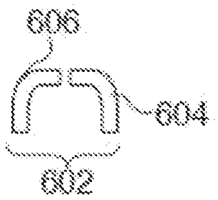
FIG. 16 is an end view of FIG. 14.
Figure 17:
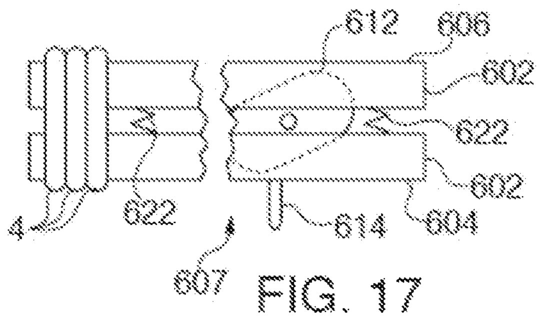
FIG. 17 is similar to FIG. 15, but shows adjustment of opposed sections to accommodate staples of different dimensions.
Figure 18:
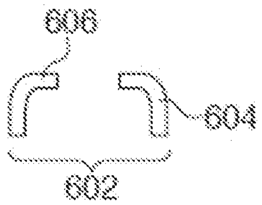
FIG. 18 is similar to FIG. 16, but reflects the adjustment shown in FIG. 17.
Figure 19:
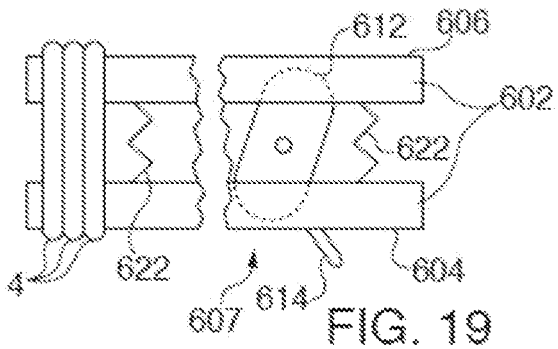
FIG. 19 is similar to FIG. 17, but shows a further degree of adjustment.
Figure 20:
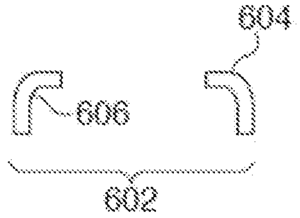
FIG. 20 is similar to FIG. 18, but reflects the adjustment shown in FIG. 19.

Staple bed 602 is seen from above in FIG. 15 and in end view in FIG. 16. Staple bed 602 is suitably supported within a housing 610 of magazine 600 (see FIG. 13) such that mirror image sections 604, 606 can spread apart from the relatively close mutual positioning shown in FIGS. 13-15. Referring particularly to FIG. 15, cam 612 is manually rotatable by lever 614 to rotate to urge mirror image sections 604, 606 apart. FIGS. 15, 17, and 19 respectively illustrate three degrees of spread, and corresponding movement of cam 612. Again, referring to FIG. 13, lever 614 is selectively movable to and retained within any of three notches 616, 618, 620 in housing 610. When occupying any one notch 616, 618, or 620, lever 614 may be depressed until it clears the bounds of its notch 616, 618, or 620, and moved laterally to a different notch 616, 618, or 620. Mirror image sections 604, 606 are urged by return springs 622, 624 (FIGS. 16, 28, 20) to return to one of the three possible positions corresponding to positioning shown in FIGS. 13-15.

Unless otherwise indicated, the terms "first", "second", etc., are used herein merely as labels, and are not intended to impose ordinal, positional, or hierarchical requirements on the times to which these terms refer. Moreover, reference to, e.g., a "second" item does not either require or preclude the existence of, e.g., a "first" or lower-numbered item, and/or, e.g., a "third" or higher-numbered item.

Tie ejector 102 has thus far been described in terms of similarity to a staple gun. It would also be possible that tie ejector 102 could be similar to a nailing gun.

Tie installing tool 100 has been described in terms of overlapping of first and second jaws 122A, 122B. It would be possible that first and second jaws 122A, 122B abut, or alternatively, remain spaced apart in the deployed position, rather than overlap (these options are not shown).

Turning now to FIGS. 24-29, another implementation provides a replaceable head 700 capable of attachment and detachment to a tie ejector apparatus or staple gun. The staple gun can be trigger activated or activated by downward pressure against rebar rods. The replaceable head 700 can be provided in different sizes to accommodate different sized ties of varying dimensions and thicknesses. Larger or thicker ties can be used to tie thicker rebar rods and vice versa.

Figure 26:
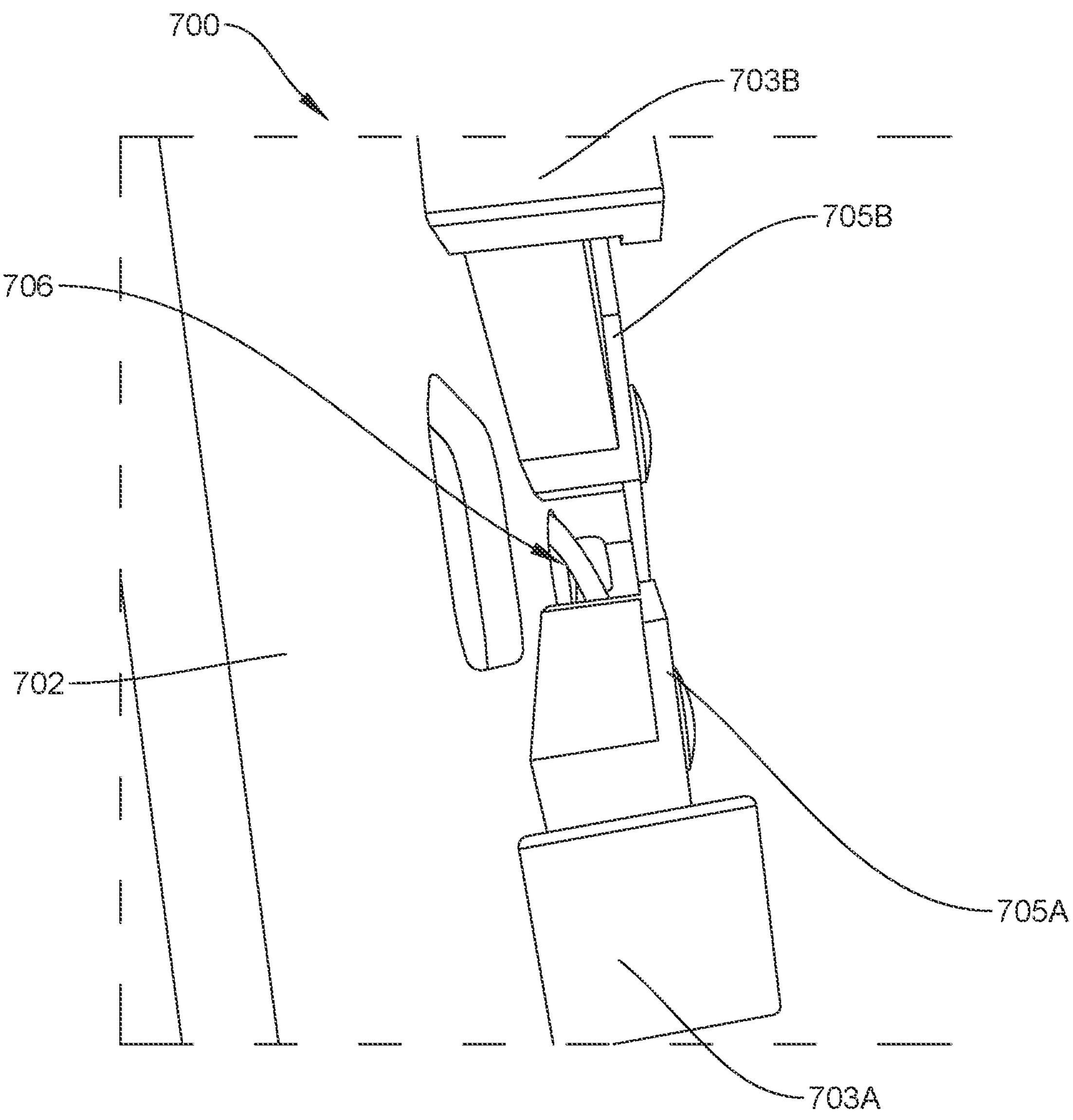
Figure 27:
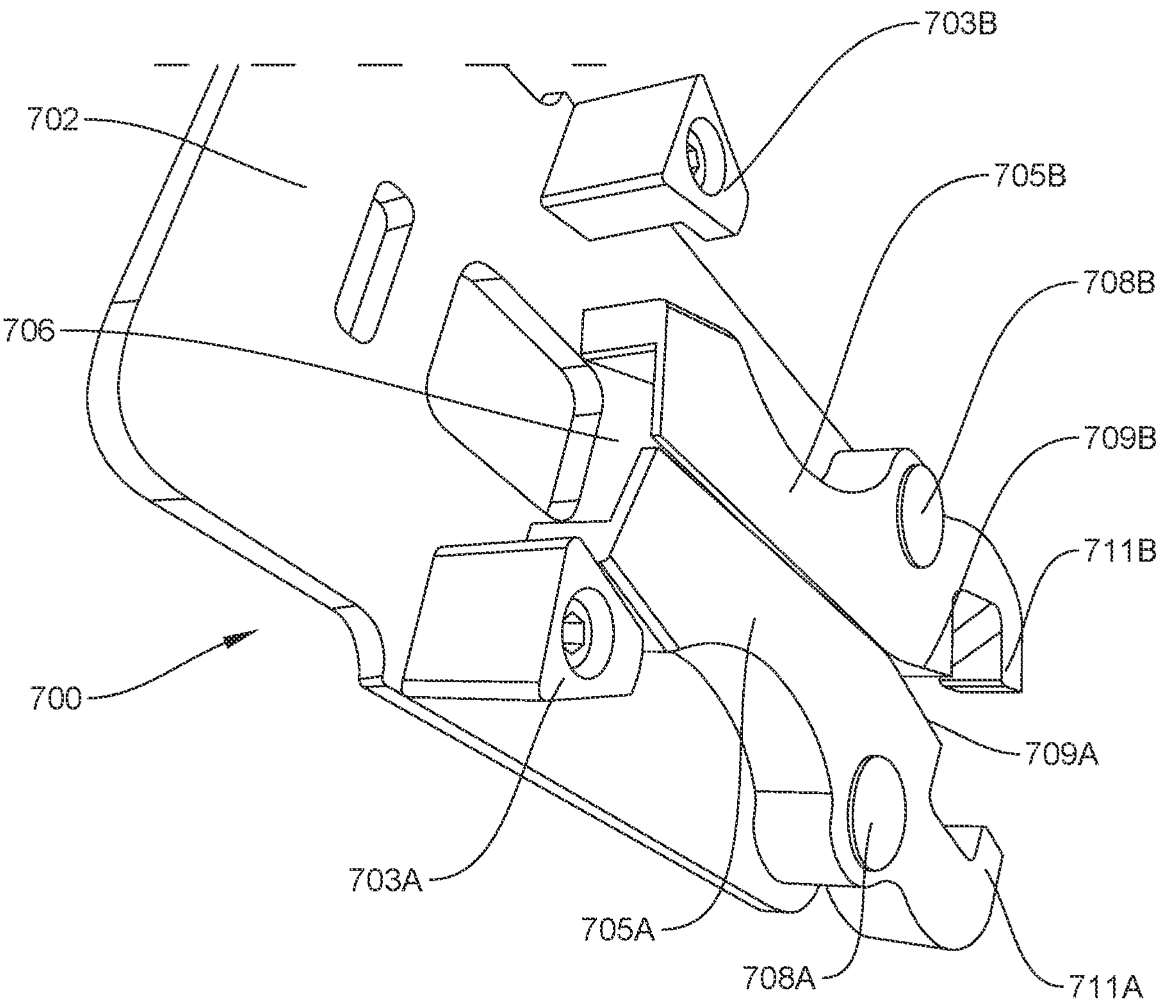

As shown in FIGS. 24-27, replaceable head 700 includes base plate 702. On a front surface of base plate along either side are two polygonal blocks 703A and 703B. In between blocks are two moveable arms 705A and 705B which meet together along central longitudinal axis of base plate. Each arm has a hollow portion which together form a hollow channel 706 along central longitudinal axis. FIG. 26 shows the arms 705A and 705B closed together at the bottom of the head 700 such that the channel 706 is widened at the top. FIG. 27 shows replaceable head 700 in more detail, including pivots 708A and 708B on which arms 705A and 705B can rotate. Arms include angled portions 709A and 709B on inner portion of arms above a set of jaws 711A and 711B. Angled portions 709A and 709B provide a triangular space allowing arms to close at together at the bottom of the head through rotation of arms around pivots 708A and 708B such that jaws 711A and 711B can come together in a closed position around rebar rods during fastening.

Figure 28:
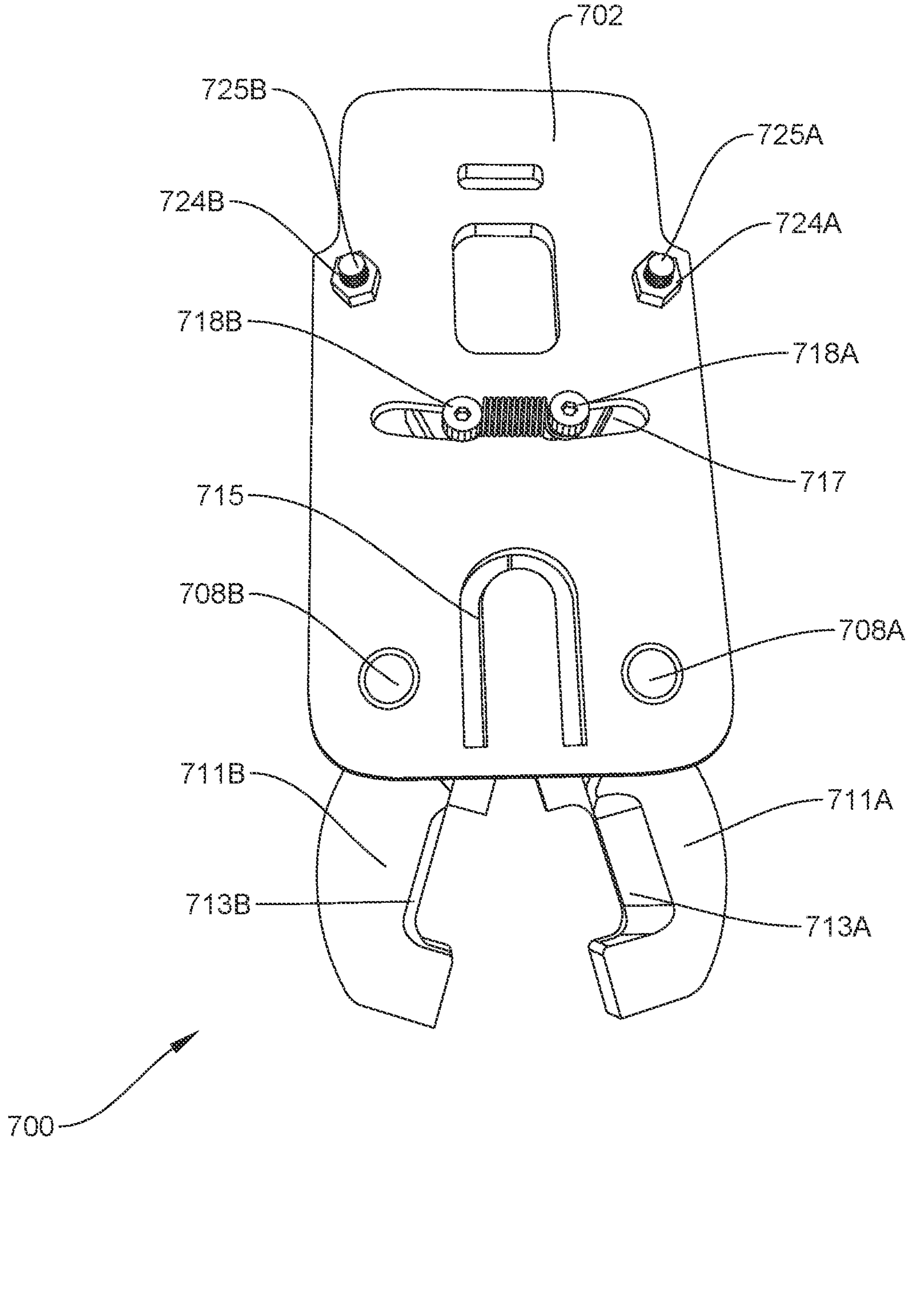
Figure 29:
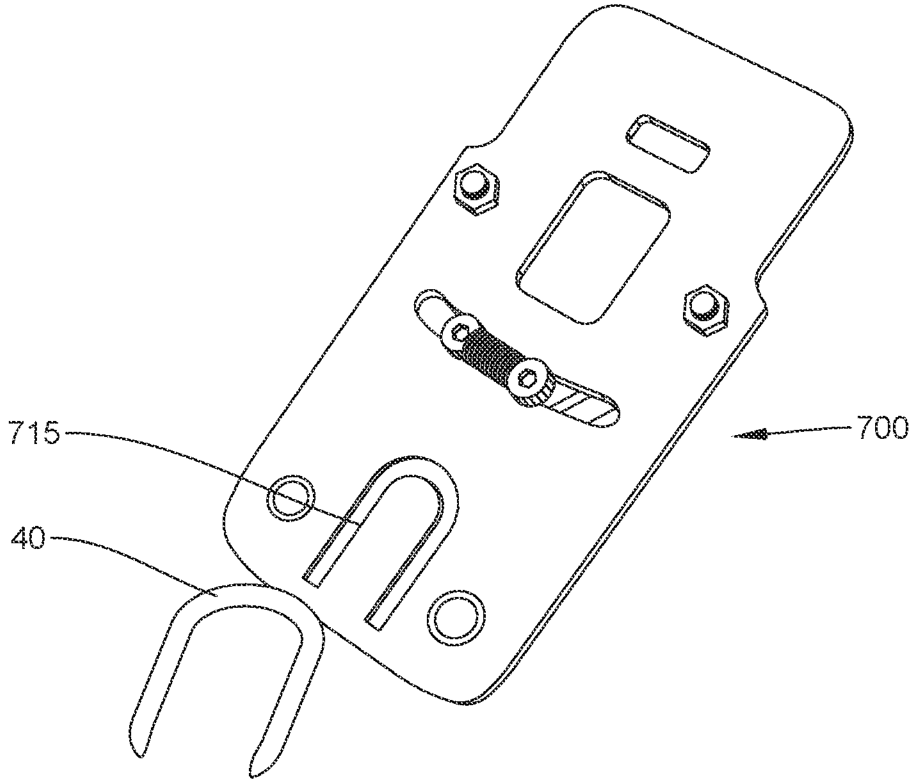
Figure 30:
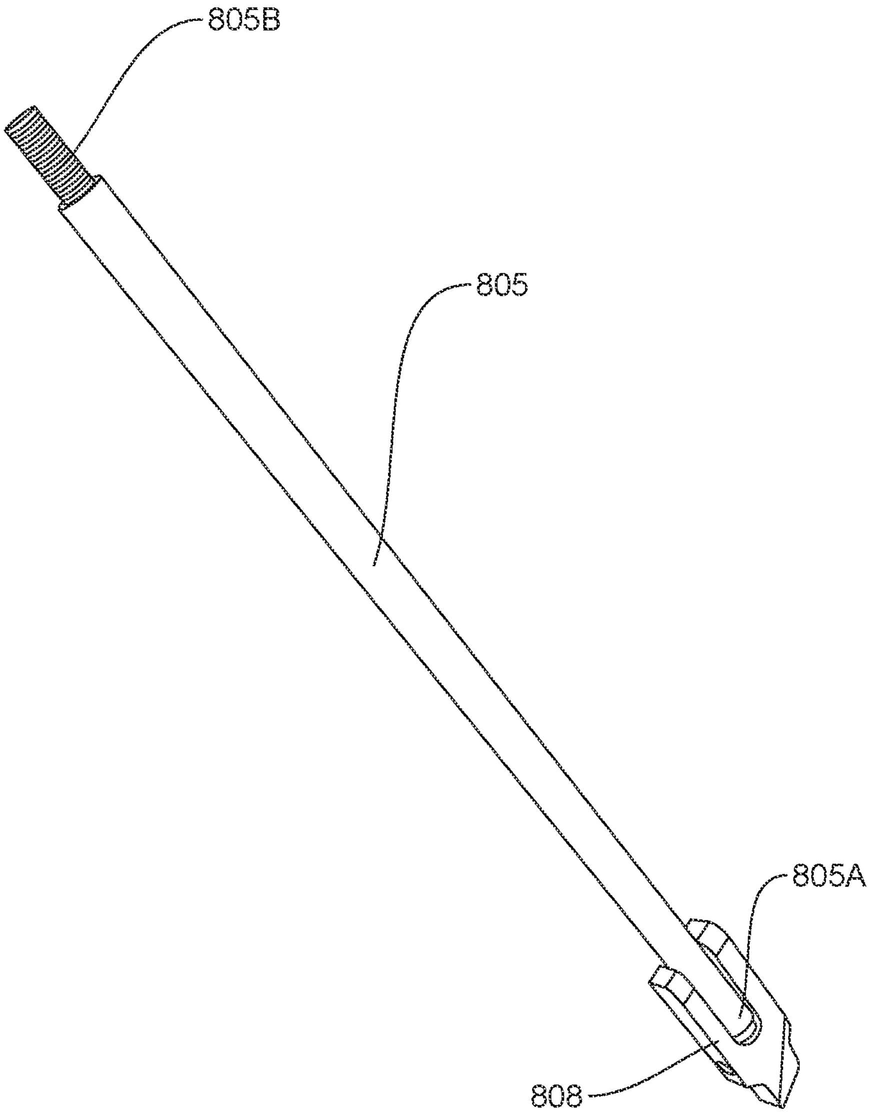
FIGS. 30-41 are images of a shaft and hammer according to one implementation, with FIG. 30 representing a top, oblique view, FIGS. 31-35 representing partial views of the shaft and hammer with a replaceable head during use, FIGS. 36-39 representing perspective detail views of the hammer at the end of the shaft, and FIGS. 40-41 representing partial views of the hammer holding a tie.
Figure 31:
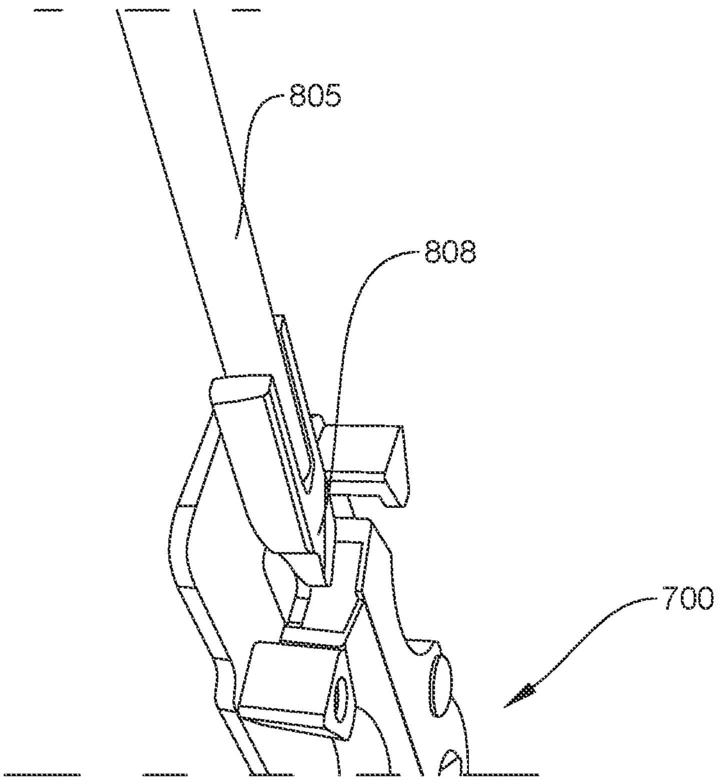
Figure 32:
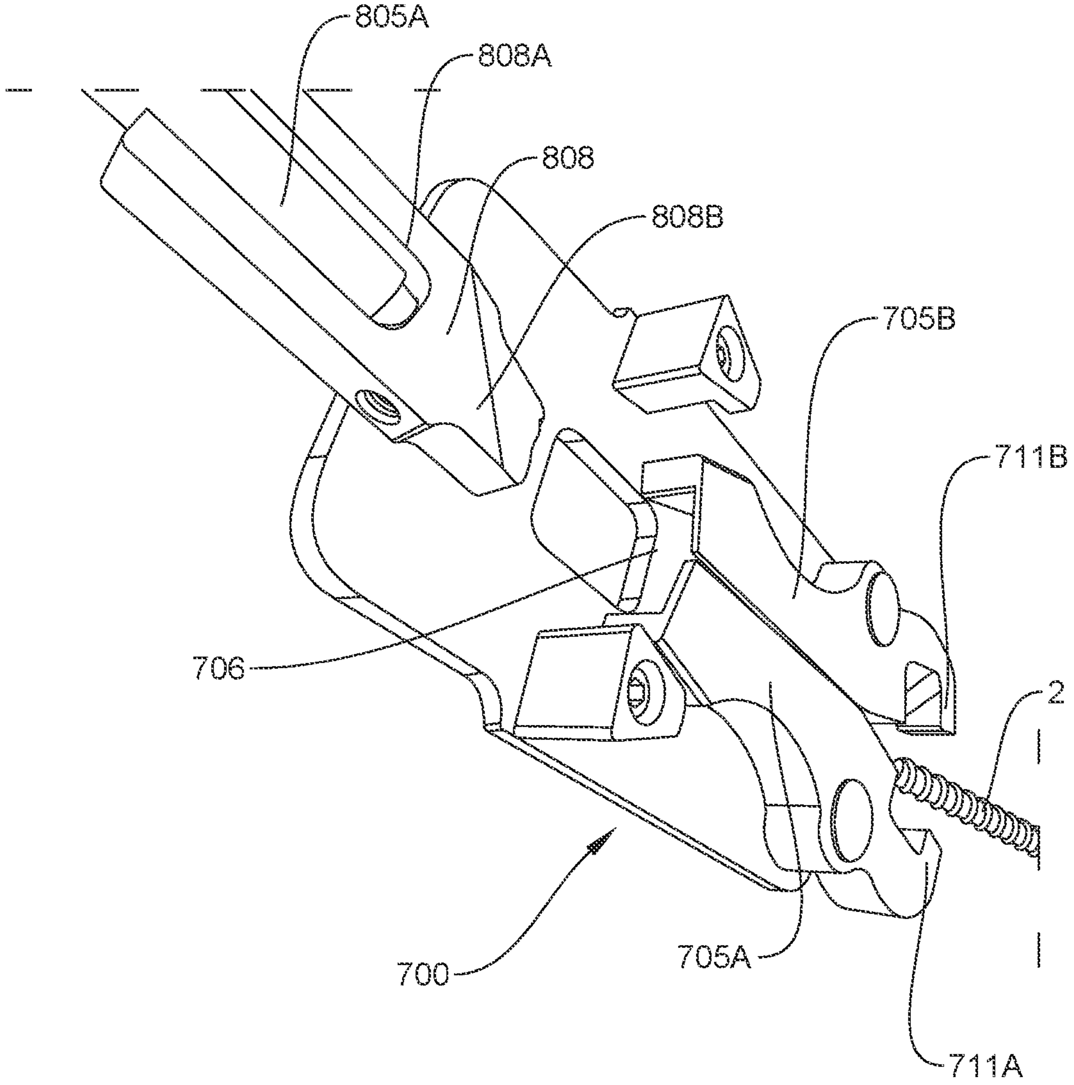

FIG. 28 shows a bottom view of the replaceable head 700, including base plate 702, underside of pivots 708A and 708B, jaws 711A and 711B including indented portion 713A and 713B on each jaw providing an opening designed to fit around rebar rods when jaws are in a closed position. A U-shaped opening 715 for receiving staples or ties of corresponding shape and size is shown between pivots 708A and 708B. A horizontal opening 717 provides space for attachment points 718A and 718B at upper ends of arms with spring 720 connecting attachment points and providing tension between the two to pull upper ends of arms close together and keep jaws 711A and 711B is an open position. Toward the top are fastener components 724A, 724B (nuts) and 725A, 725B (screws) for attaching polygonal blocks to base plate 702. FIG. 29 shows the same view of underside of replaceable head 700 with tie opening 715 and tie 40 held and positioned above opening.

Figure 33:
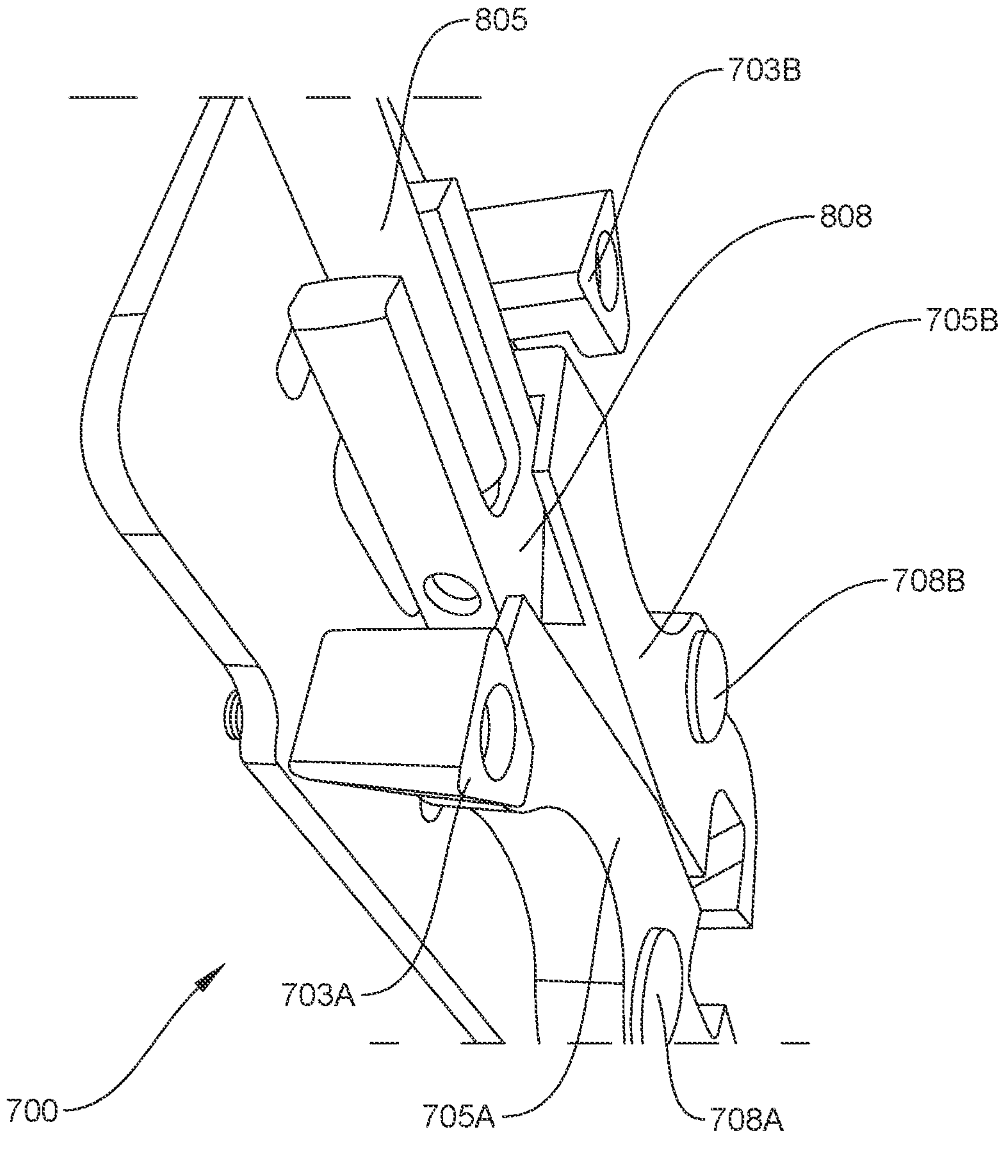
Figure 34:
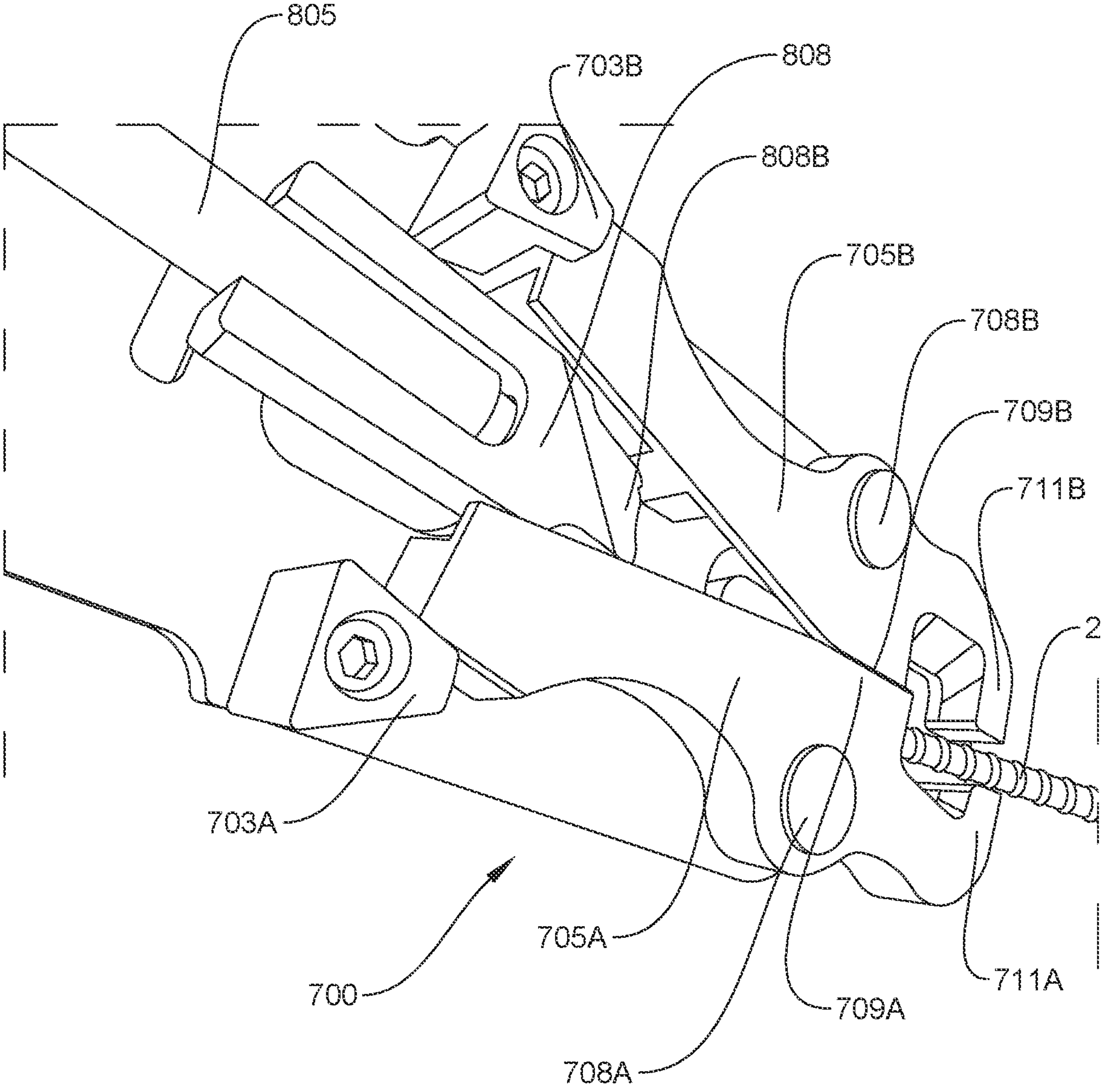
Figure 35:
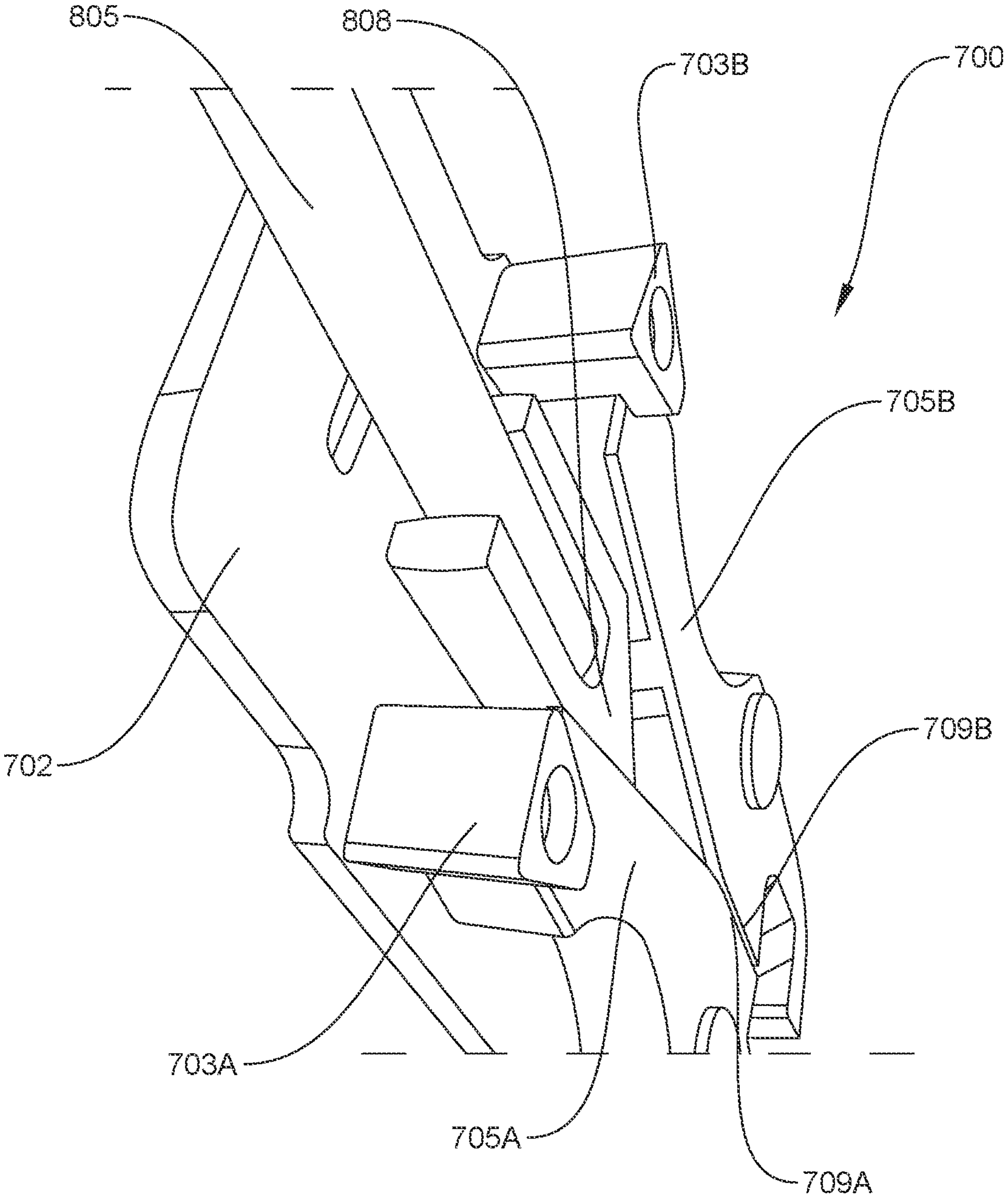
Figure 36:
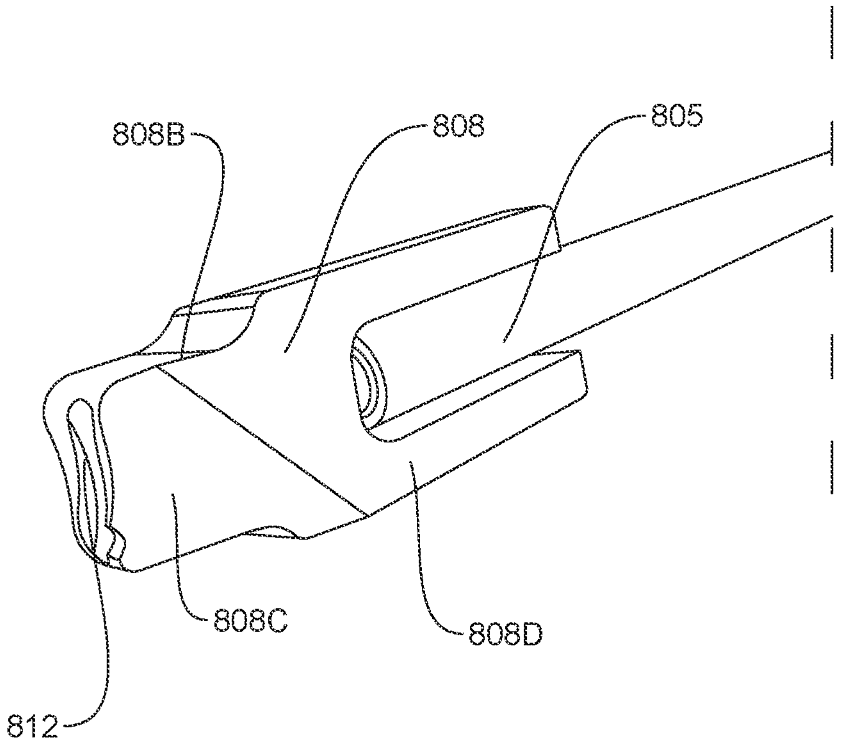
Figure 37:
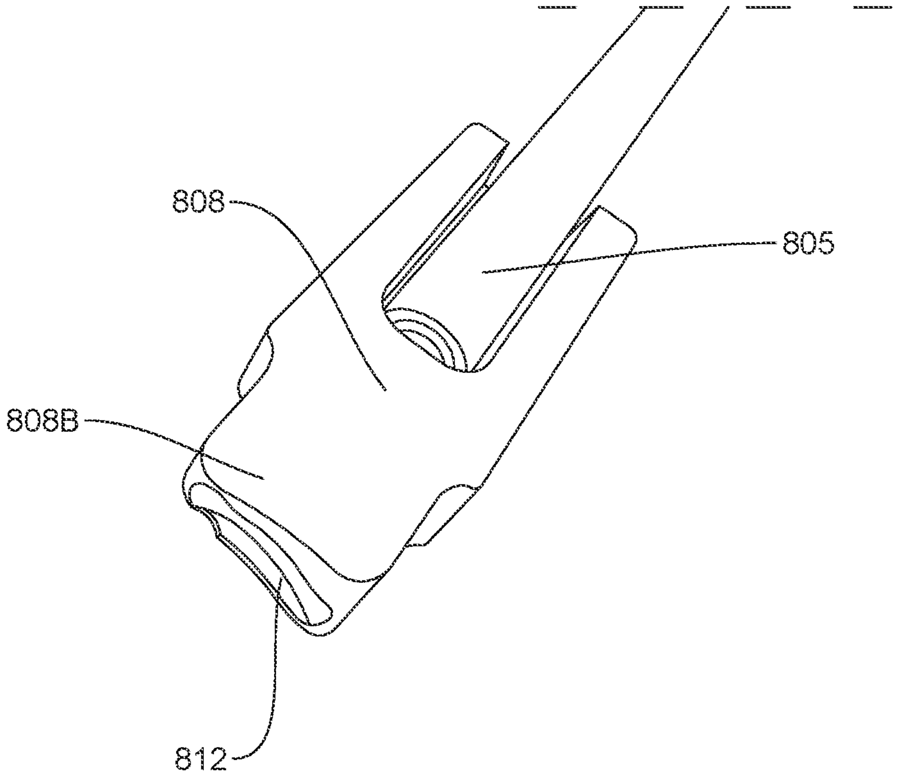

Turning now to FIGS. 30-35, a shaft 805 and hammer 808 designed to hold and push the tie into the hollow channel 706 of the replaceable head 700 are shown. A proximal end 805A of the shaft fits within a groove 808A of the hammer 808 while a distal end 805B is tapered to fit at the end of a linear actuator of a tie or staple gun. The linear actuator pushes the shaft with hammer at the end forward to advance through the hollow channel 706 or backward to retreat from channel 706. The actuator can be a pneumatically driven actuator, or can be driven by other means, including belt and screw drives. As shown in FIGS. 32-35, the hammer 808 has a narrowed end 808B which mates with the hollow channel 706 of the replaceable head. As the actuator pushes the hammer head 808 downward though the hollow channel by way of the shaft 805, the hammer wedges between that upper portions of arms 705A and 705B to force them apart. As upper portion of arms are forced apart, arms rotate around pivots 708A and 708B, such that lower jaw portions of arms close around rebar 2 in a closed position. As shown, there is no linkage or linking member connecting shaft 805 or hammer 808 with arms 705A and 705B; the hammer is forced forward or backward by the linear actuator through the hollow channel 706 wedging between the arms 705A, 705B of the replaceable head 700 to provide rotation of the arms. In the closed position. the jaw portions stop due to both angled portions 709A and 709B of arms meeting and coming into contact above jaws. Polygonal blocks 703A and 703B have a space that receives a top edge of arms 705A and 705B as they are forced apart, but also have endwalls surrounding and defining boundary of the space that limits the movement of arms horizontally as well as vertically, as shown in FIGS. 33-34. A second plate (not shown) can be placed above the arms to sandwich them between the base plate restricting any movement vertically above the base plate.

Figure 38:
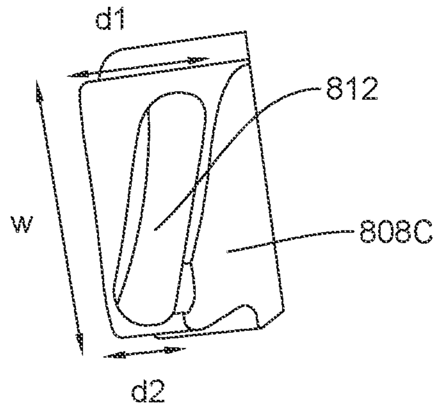
Figure 39:
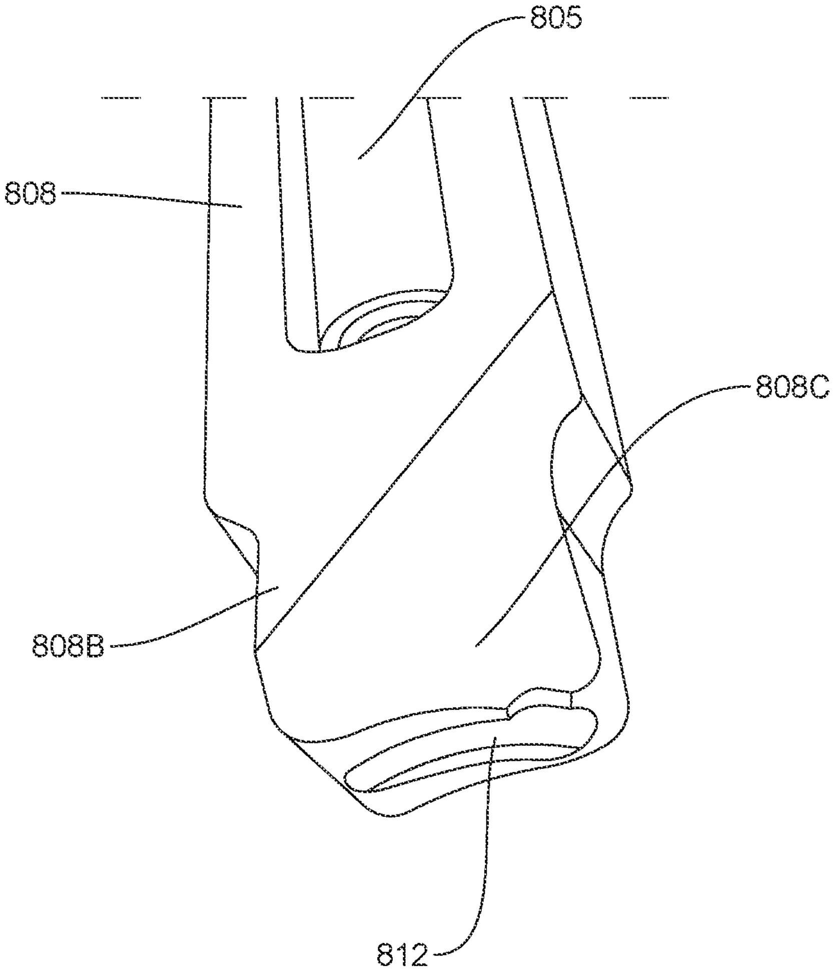
Figure 40:
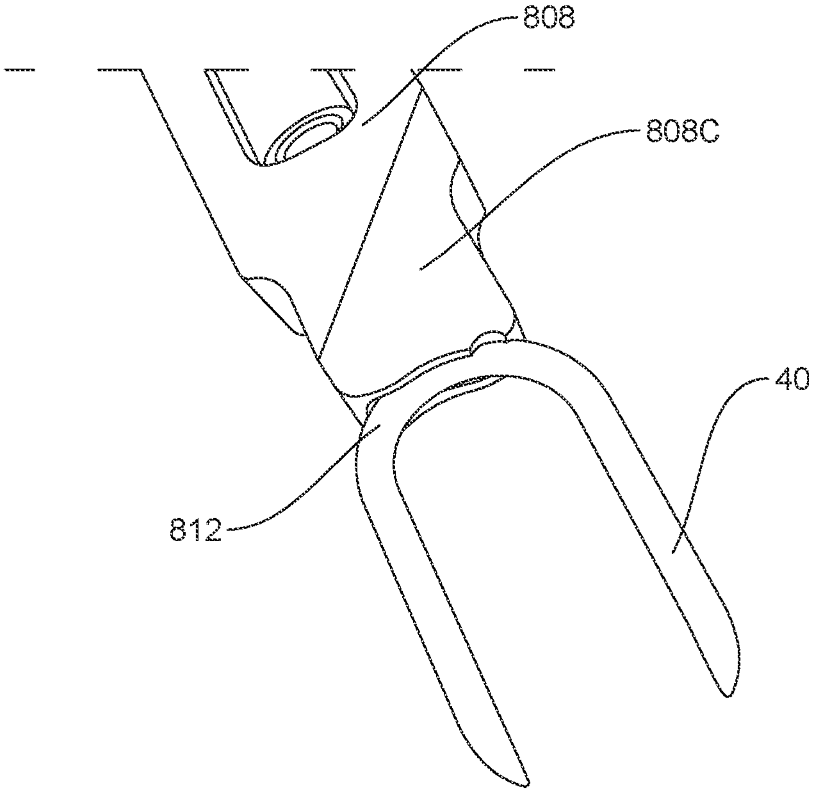
Figure 41:
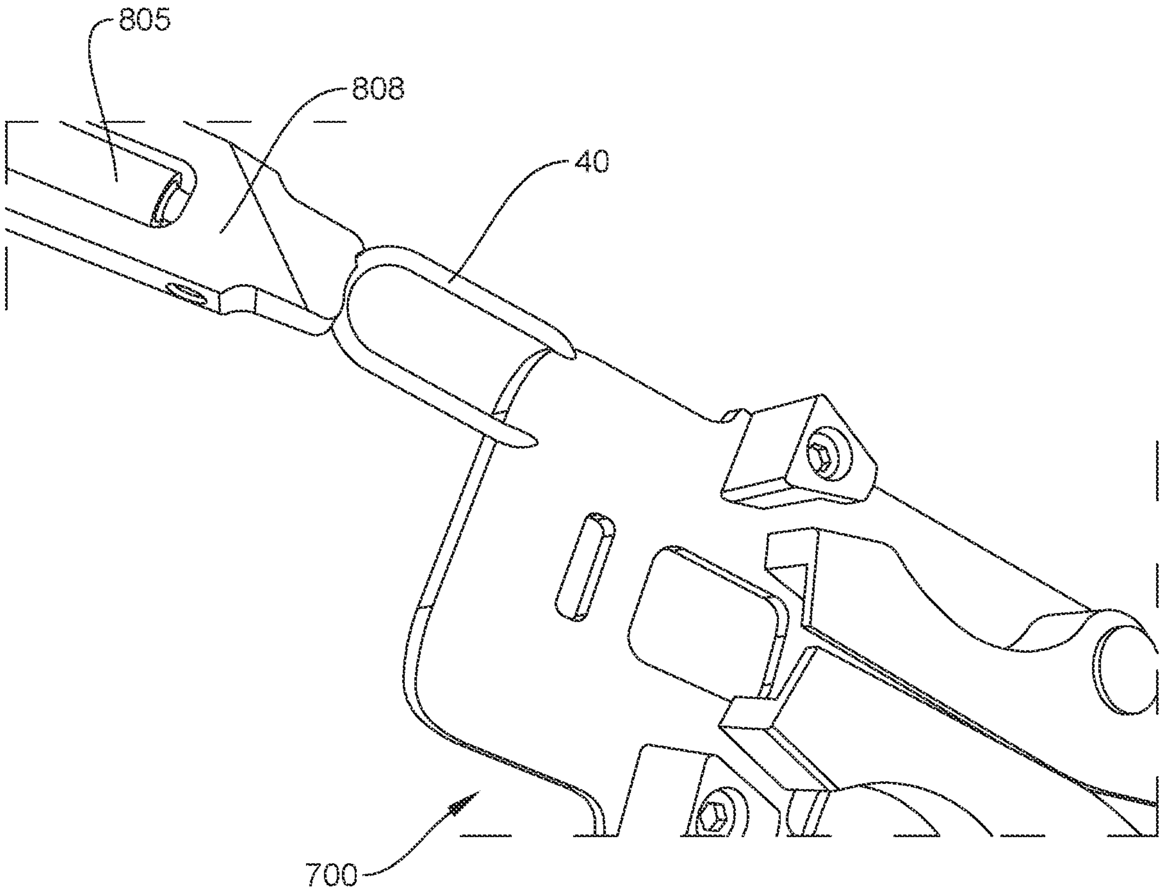
Figure 42:
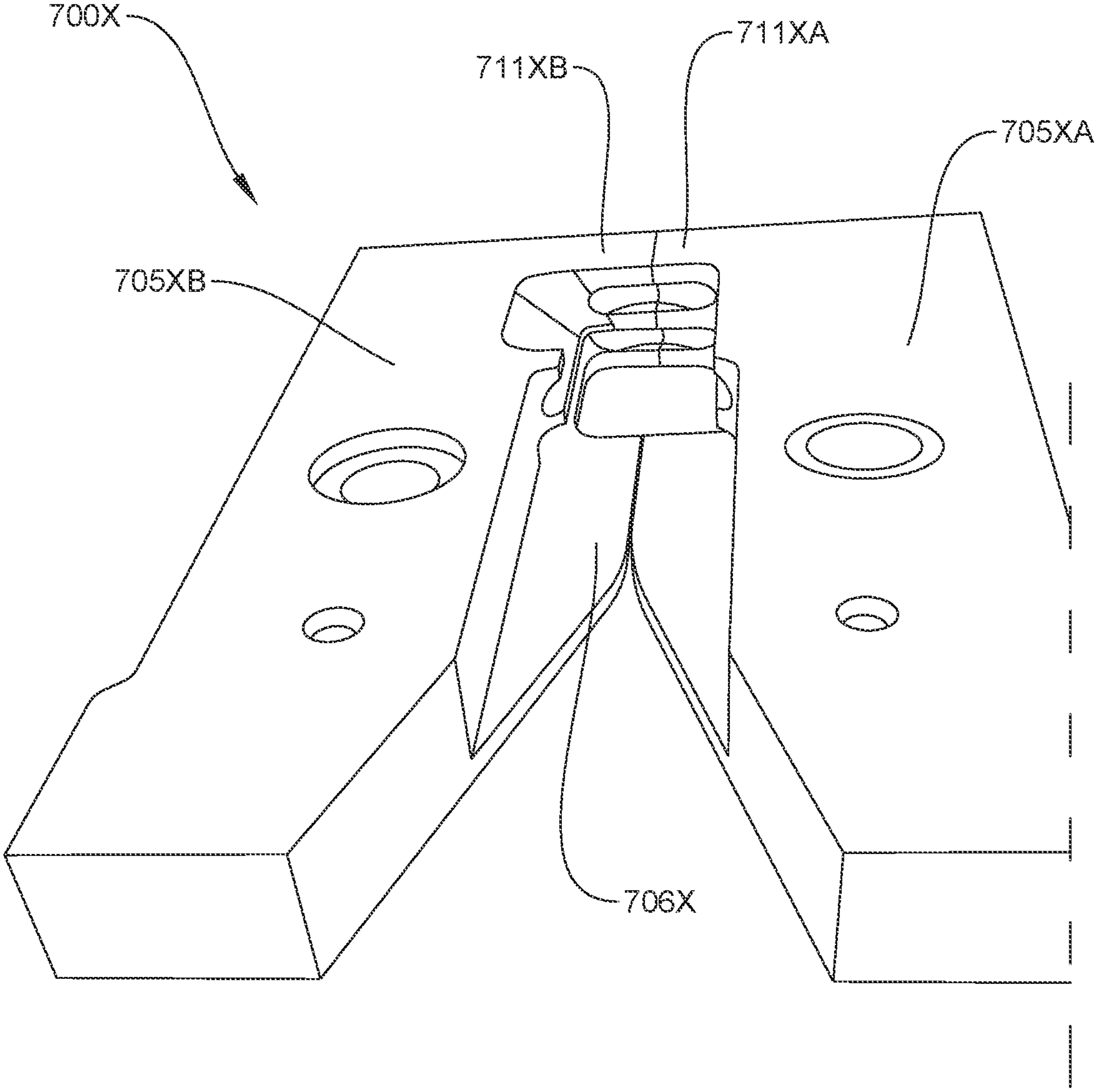
FIGS. 42-46 are images of a partially assembled replaceable head according to one implementation showing left and right arm and jaw portions, shown at various front and top oblique views, with FIGS. 44 and 46 including partial views of shaft and hammer during use.
Figure 43:
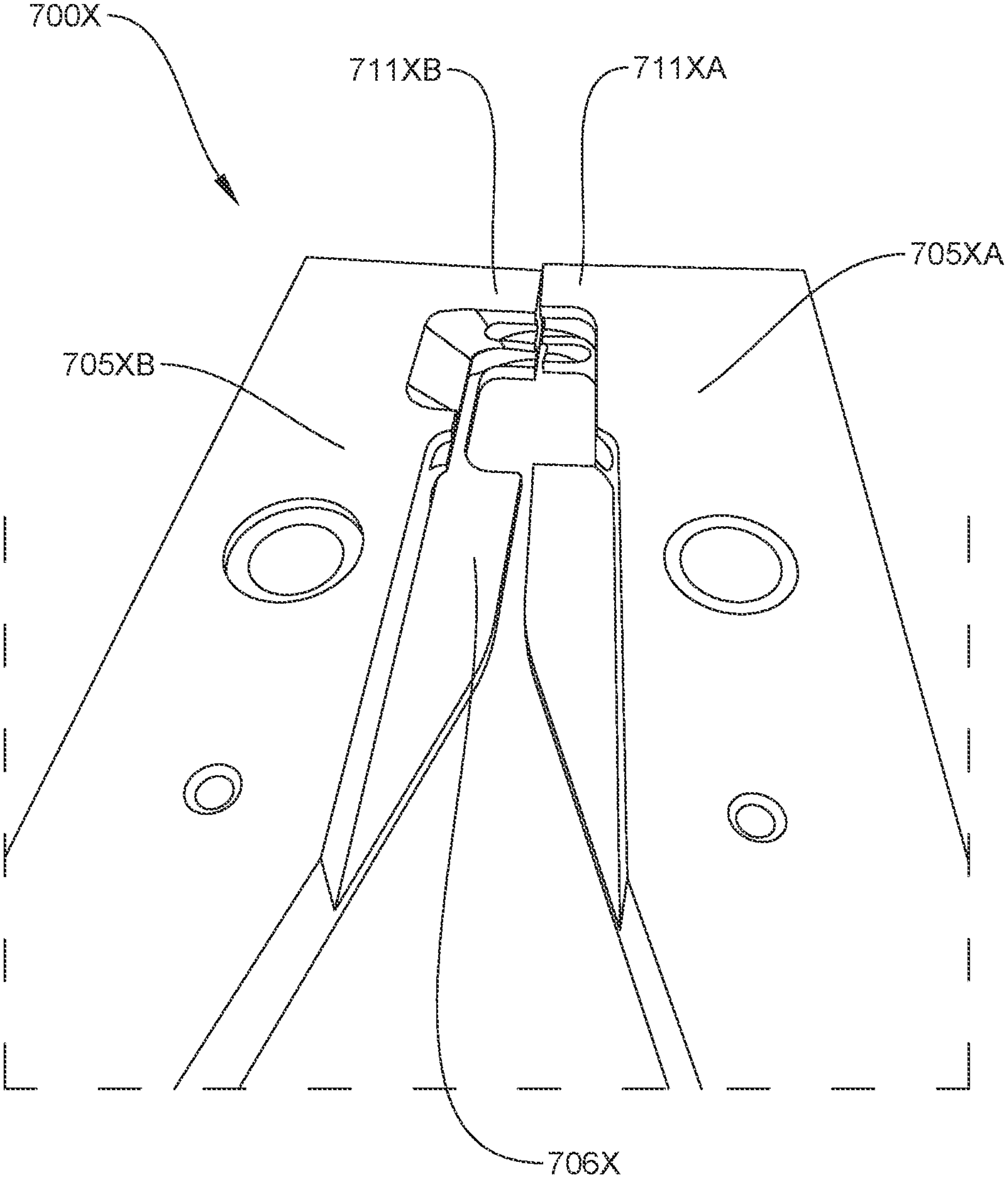
Figure 44:
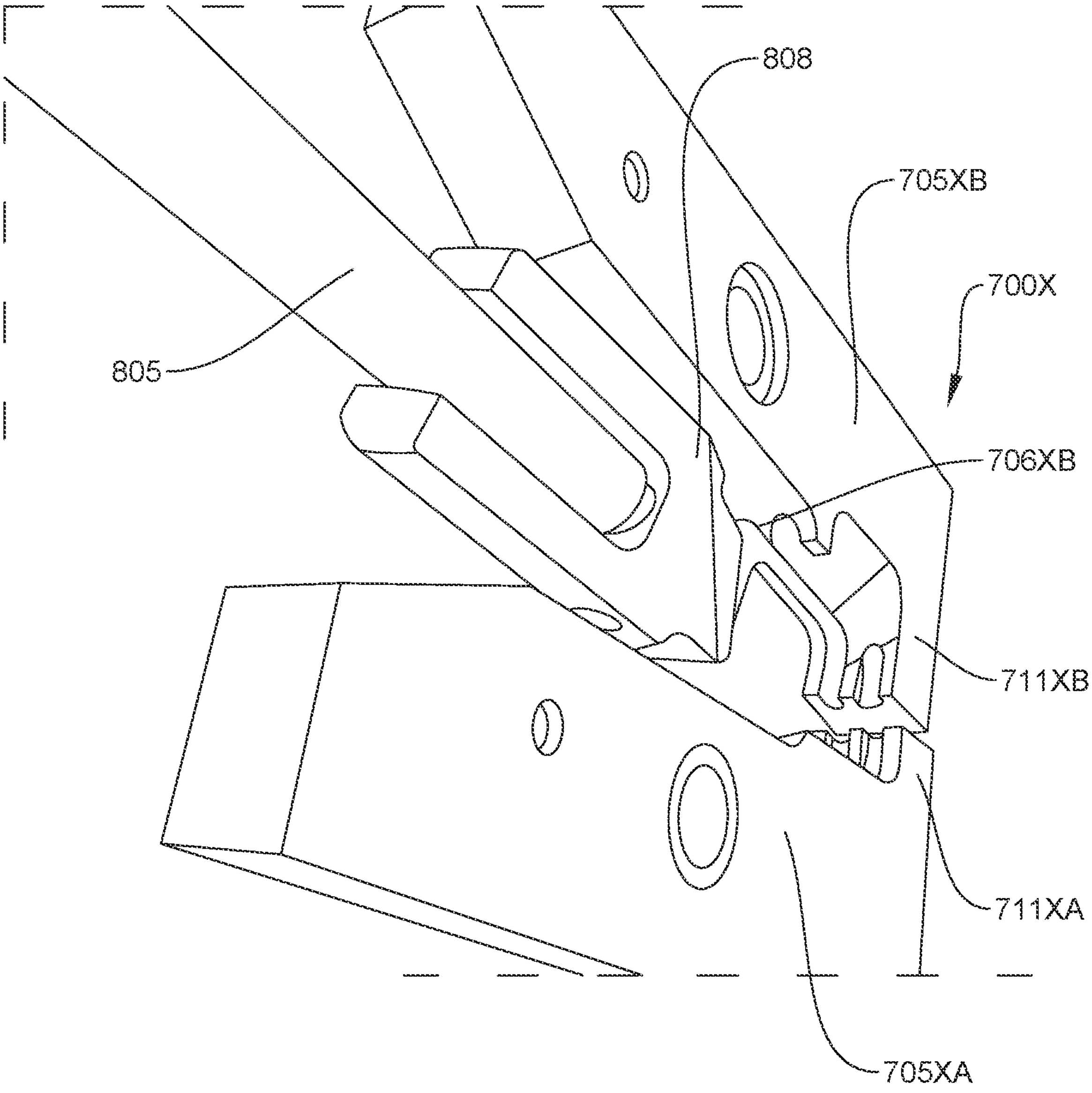

FIGS. 36-41 show the structure of the hammer 808 in more detail. The hammer 808 includes surface 808C offset at an angle from a side 808D of the hammer 808 and partially extending though narrowed end 808B of hammer. This angled surface 808C is most clearly seen in the views shown in FIG. 38 and FIG. 39. A slot 812 at the end of the hammer 808 runs parallel to angled surface 808C. As such, slot 812 is disposed at an acute angle relative to a line defining hammer width. This is most clearly shown in FIG. 38, where slot 812 runs at an acute angle to width w instead of parallel. The depths at the end of the hammer on either end of slot 812 are different, with depth d1 greater than depth d2, due to the effect of angled surface 808C terminating at end of hammer. The slot can be disposed to run at an angle of about 10 to about 30 degrees relative to width w, including 11, 12, 13, 14, 15, 16, 17, 18, 29, 20, 21, 22, 23, 24, 25, 26, 27, 28, 29 degrees relative tow. As shown in FIGS. 38 and 39, angled surface 808C terminates to form one side of slot 812. FIGS. 39 and 40 show that slot has slight curvature to accommodate curved top portion of horseshoe-shaped or U-shaped staple or tie 40. FIG. 41 shows tie 40 is held at end of hammer 808 by slot. However, during actual use, tie would drop in place though U-shaped tie opening 715 at back of base plate 702 close to jaws 711A and 711B. Hammer 808 driven by shaft 805 moved by linear actuator would grab tie 40 at that point as hammer moves downward through hollow channel 706.

Figure 45:
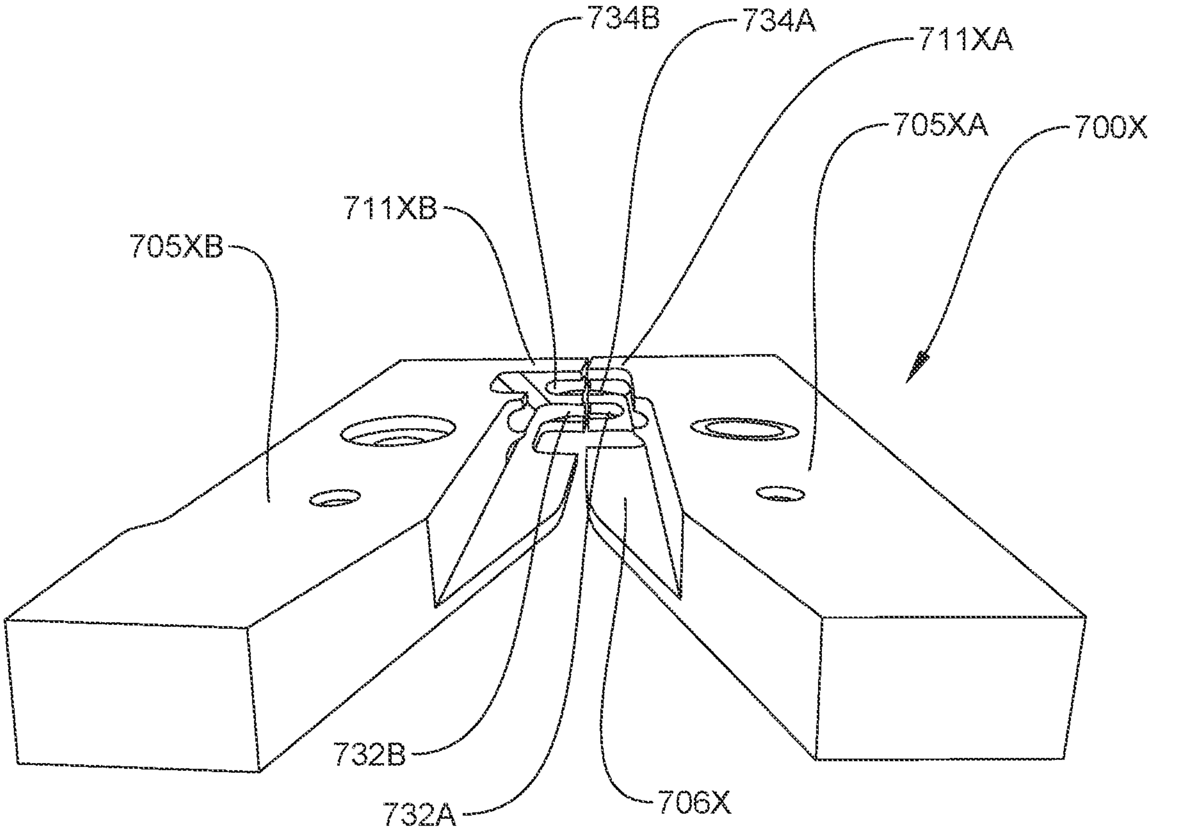
Figure 46:
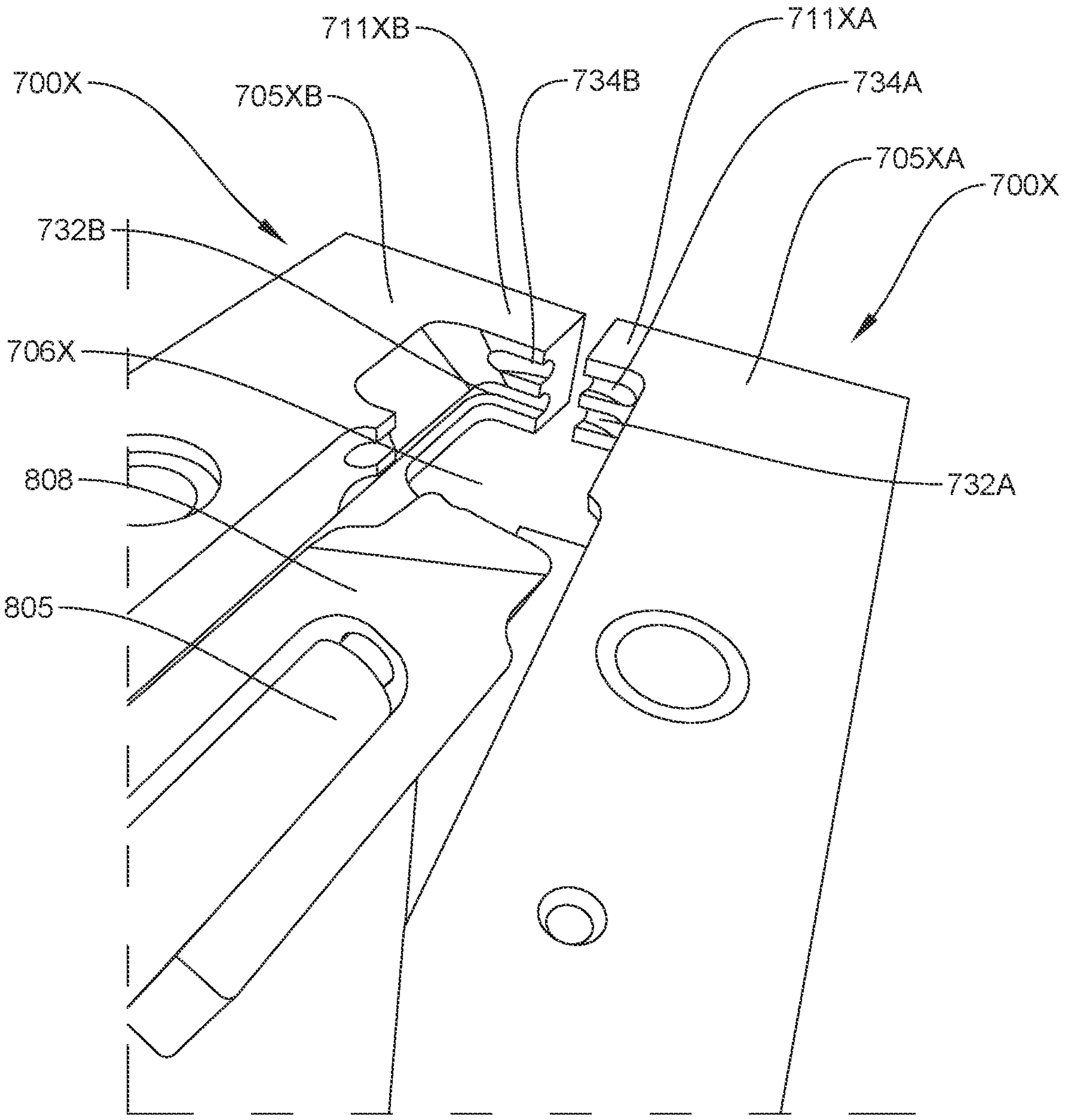
Figure 47:
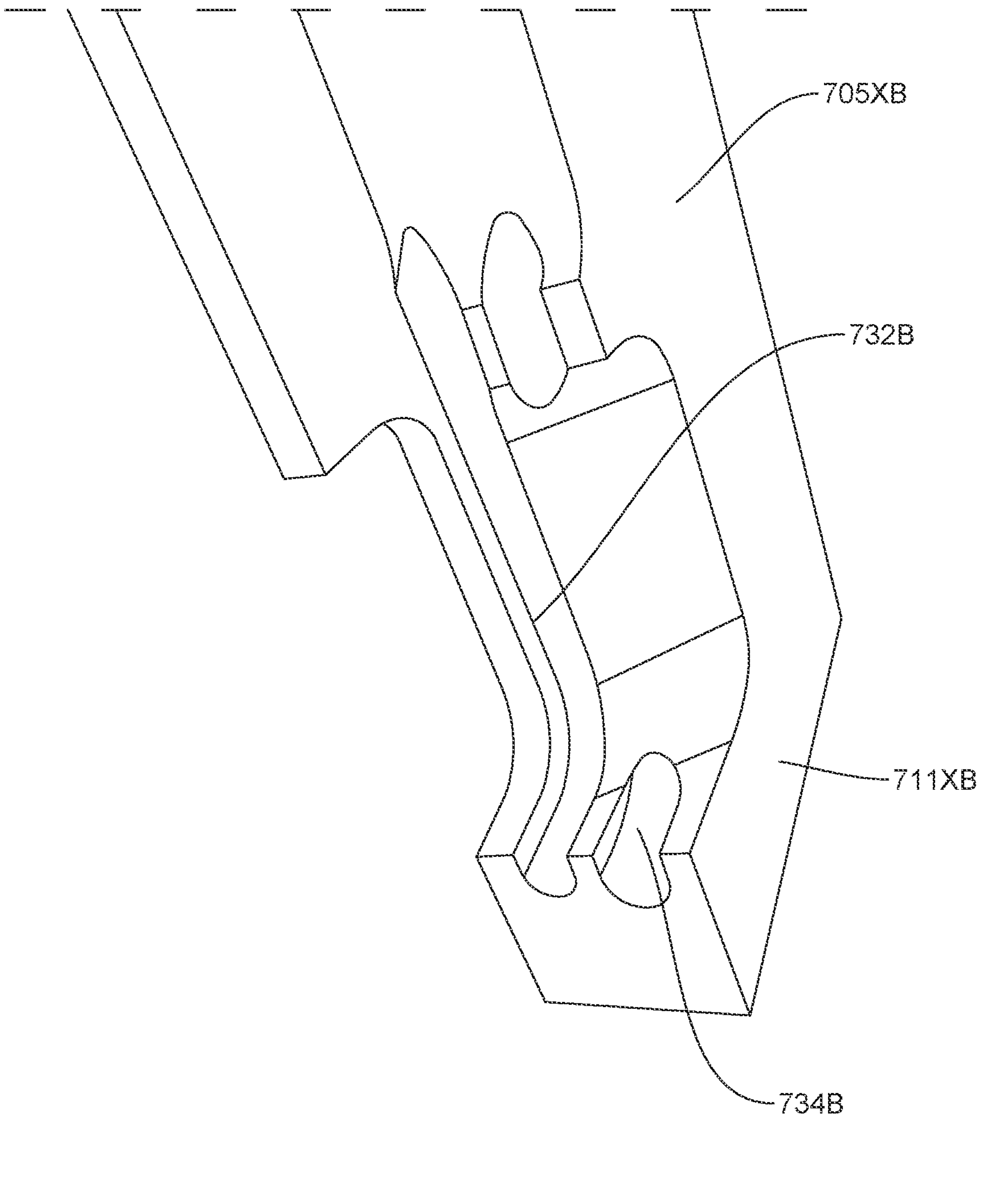
FIGS. 47, 48A, and 48B are images showing partial views of an arm member according to one implementation, with FIGS. 48A and 48B showing the path of a tie along a channel or groove in the arm member during use.
Figure 48A:
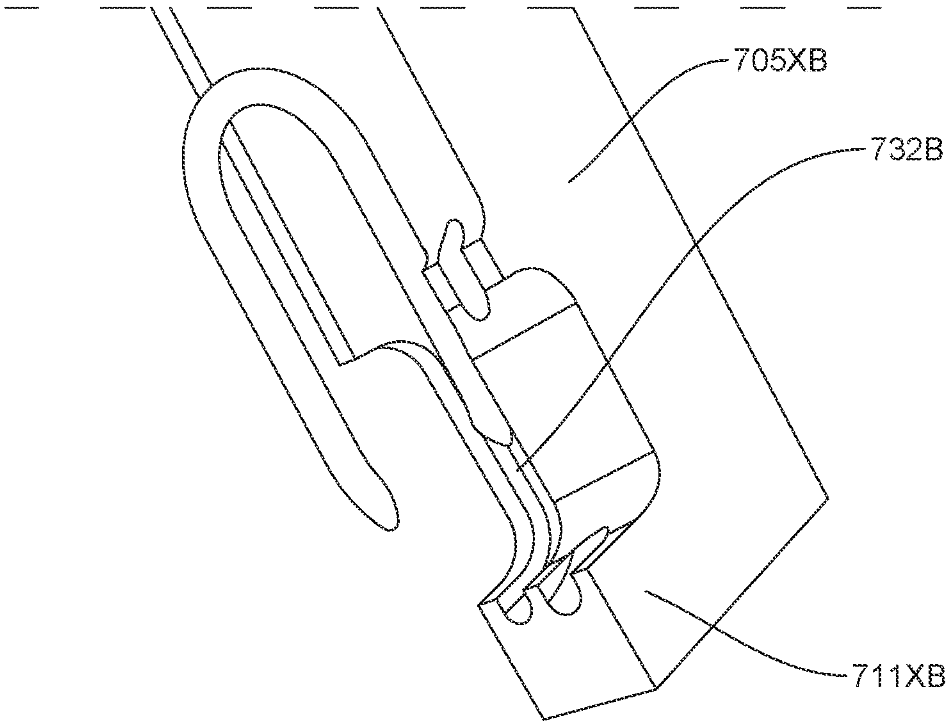
Figure 48B:
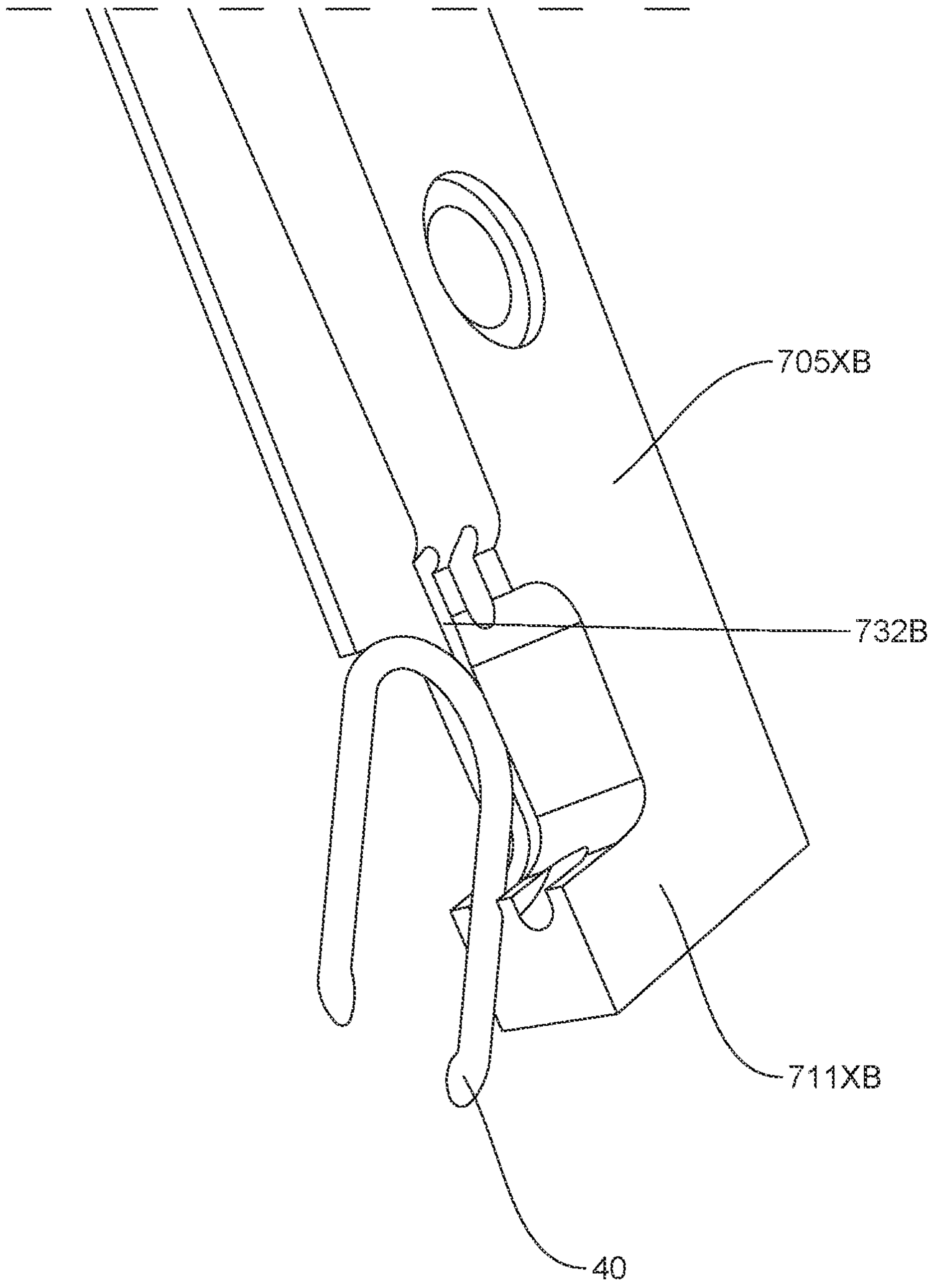
Figure 49A:
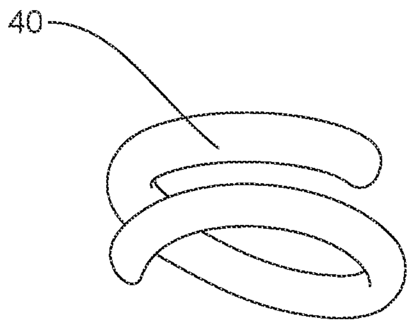
FIGS. 49A and 49B are images showing a tie that has been mechanically bent by the hammer and adjustable head to form a spiral knot according to one implementation, with FIG. 49A showing the tie in isolation and FIG. 49B showing the tie surrounding two pieces of rebar to form a rebar joint.
Figure 49B:
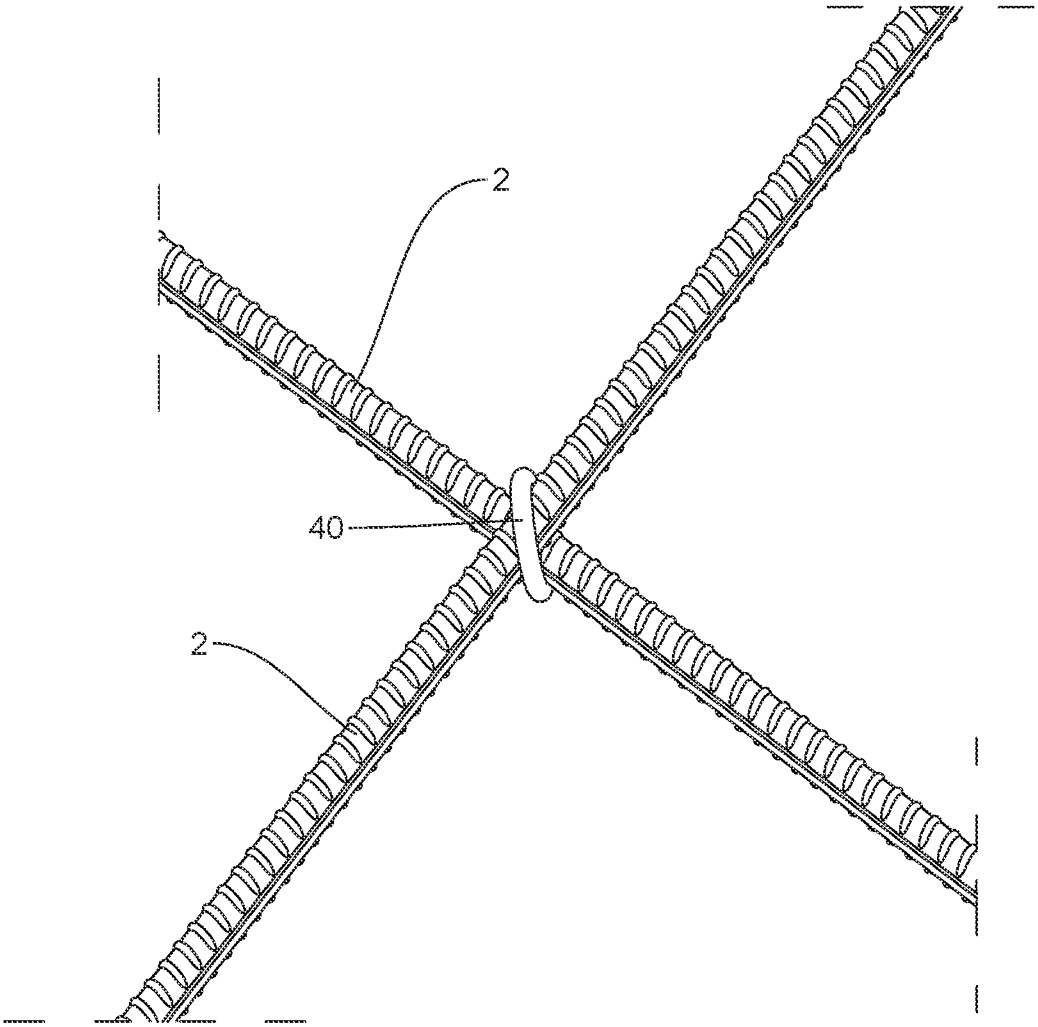
Figure 50:
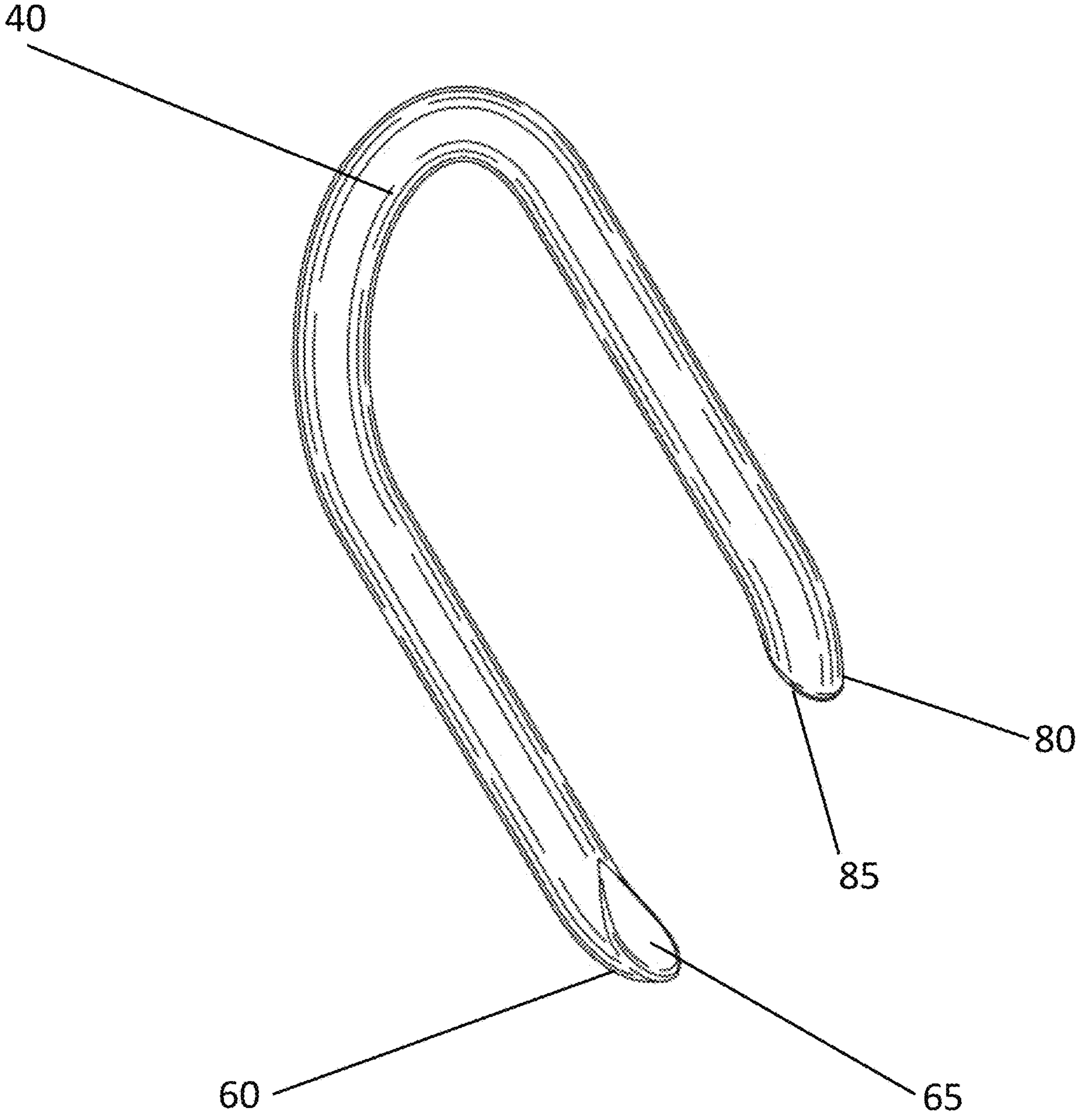
FIGS. 50-53B are diagrams of a horseshoe-shaped or U-shaped staple or tie according to one implementation, with FIG. 50 representing an oblique view, FIGS. 51A and 51B representing front and back views, FIGS. 52A and 52B representing side views, and FIGS. 53A and 53B representing top and bottom views.
Figure 51A:
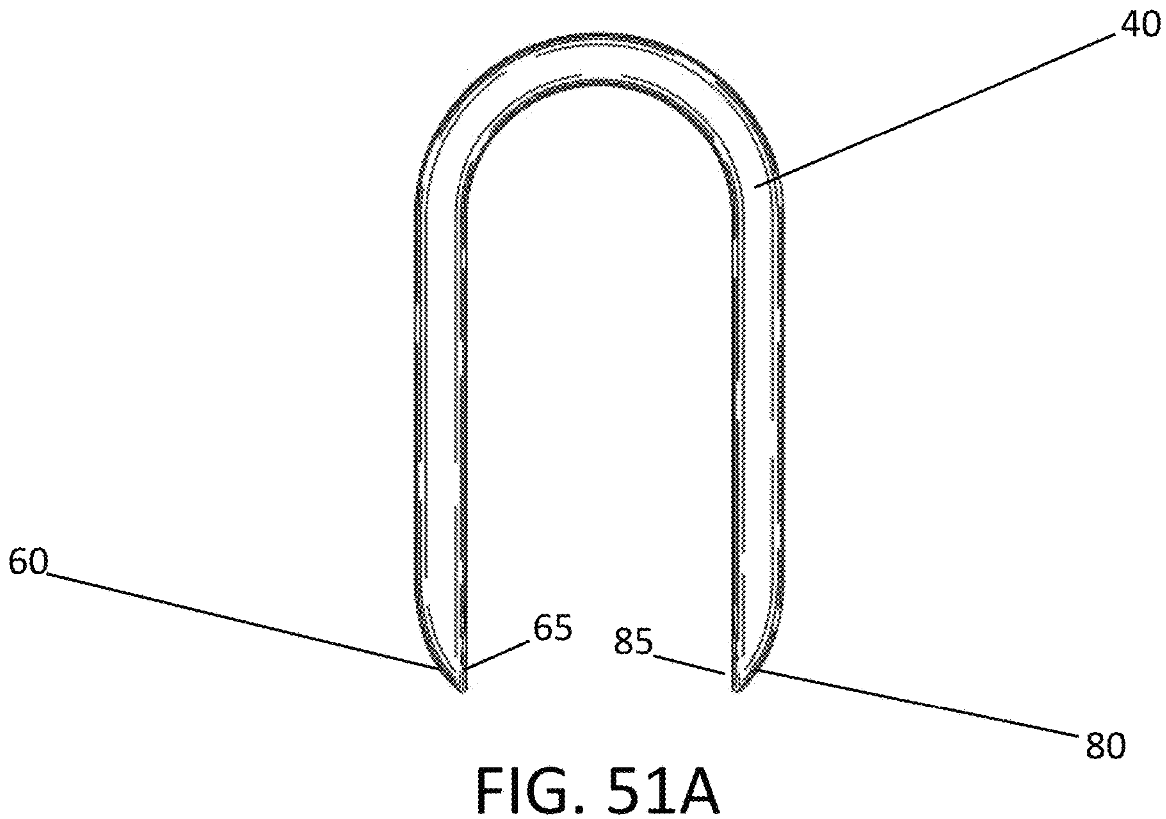
Figure 51B:
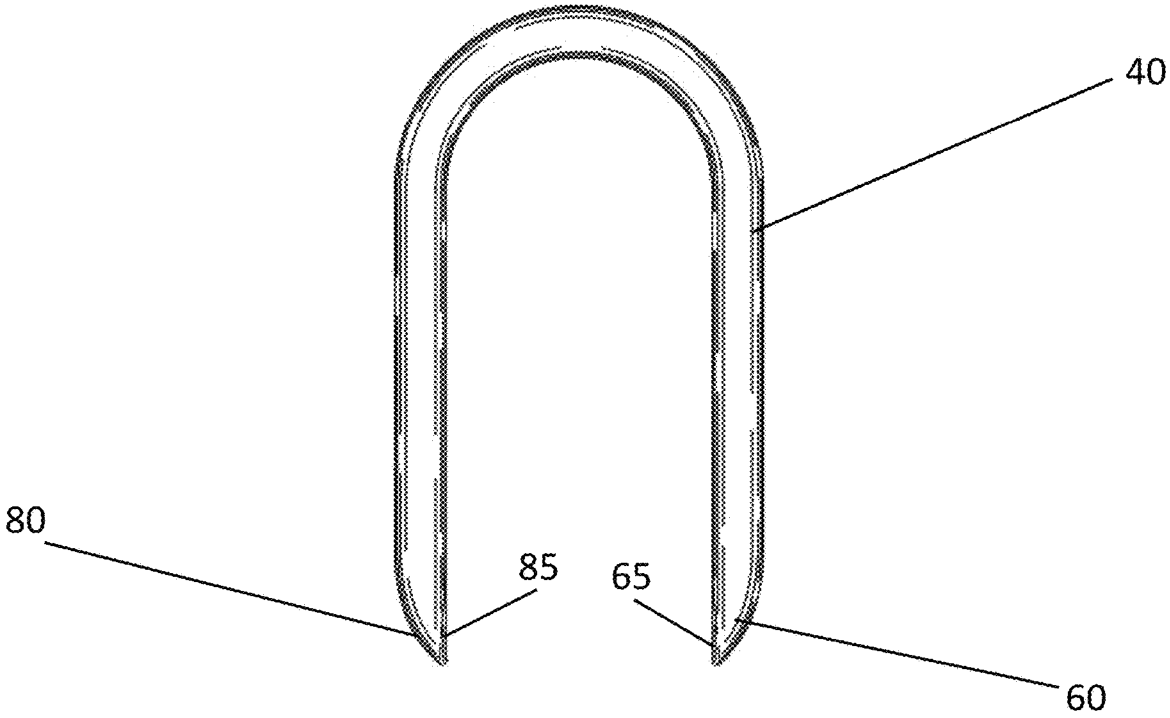
Figure 52A:
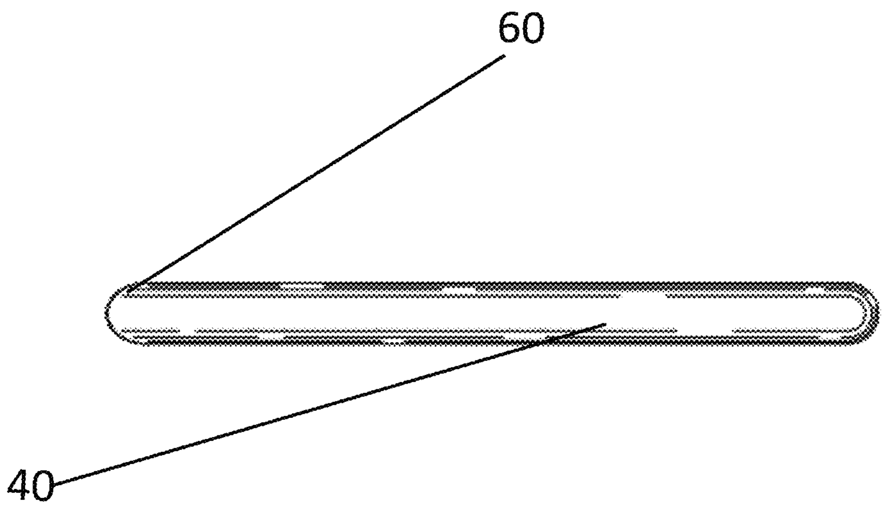
Figure 52B:
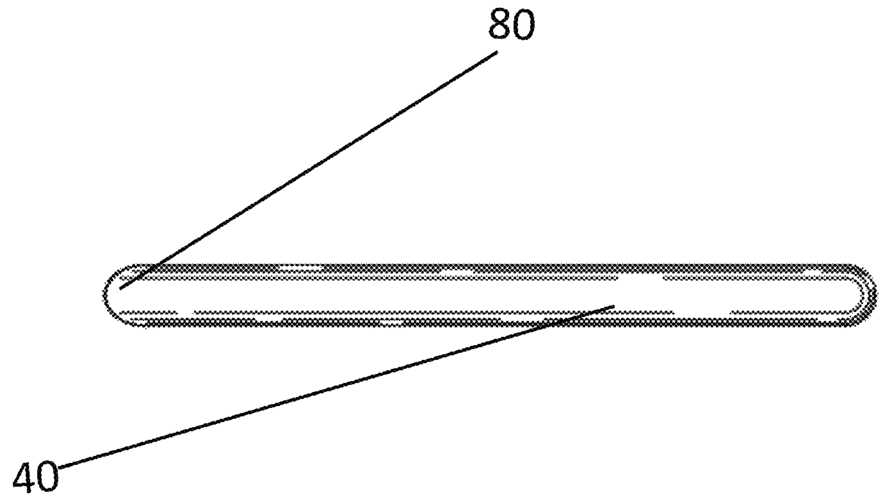
Figure 53A:
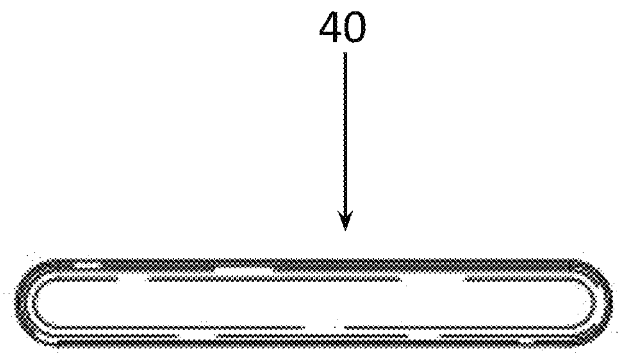
Figure 53B:
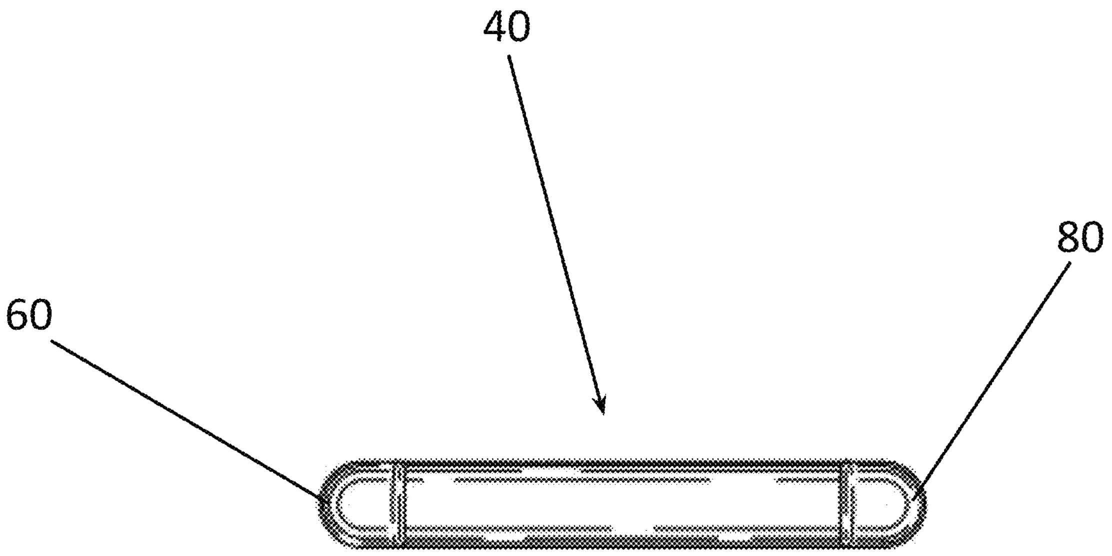
Figure 54:
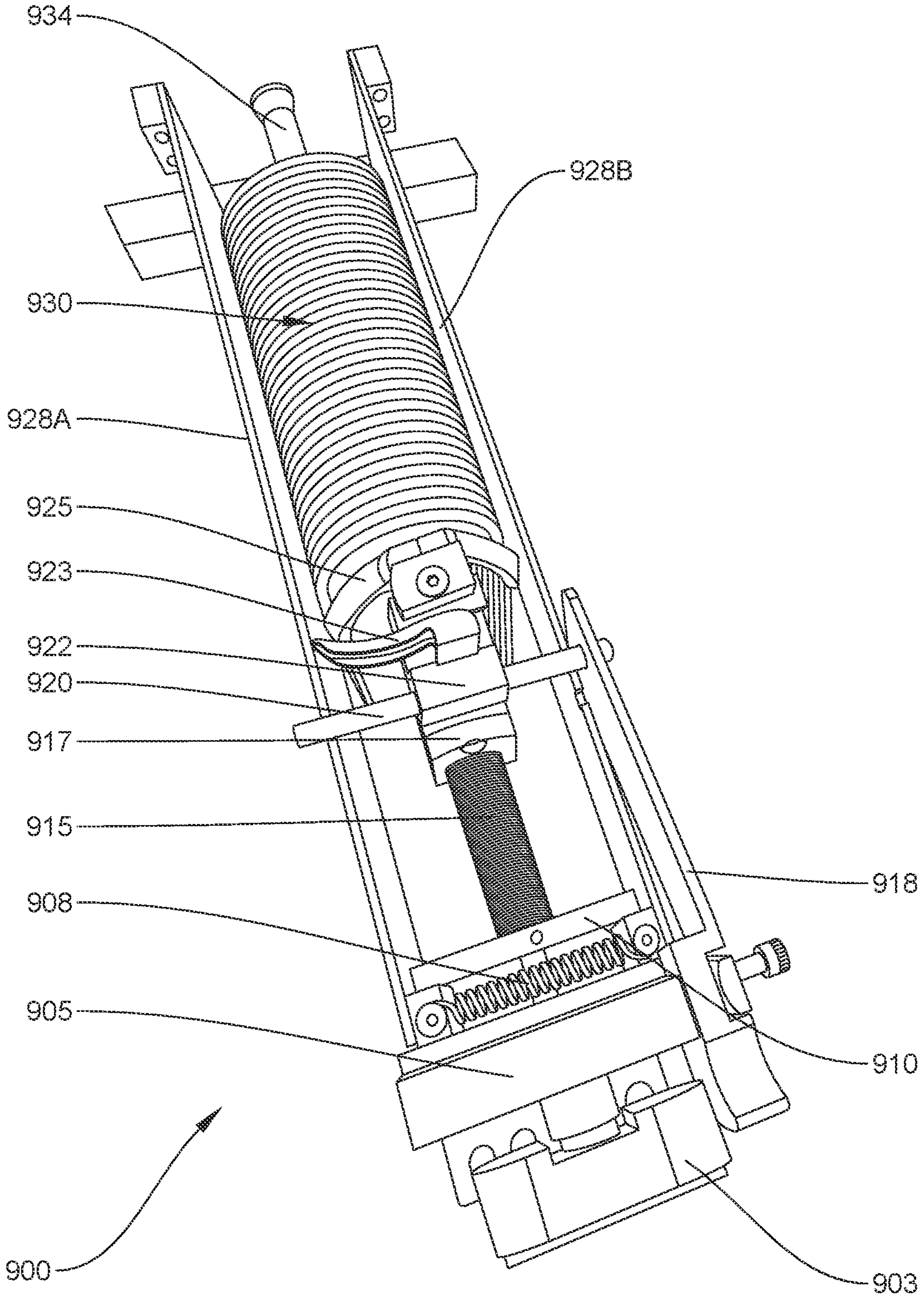
FIGS. 54-61 are images of an adjustable track for holding ties according to one implementation, with FIGS. 54 and 57 representing a top, oblique view featuring a first end of the adjustable track, FIG. 55 representing a partial view featuring the first end, FIG. 56 representing a top, oblique view featuring a second end of the adjustable track, FIG. 58 representing a top, oblique view of the adjustable track with the axial spring in an extended position, FIG. 59 representing a bottom, oblique view, FIG. 60 representing a top, oblique view with an endplate attached to the second end of the adjustable track, and FIG. 61 representing a side view of the adjustable track.
Figure 55:
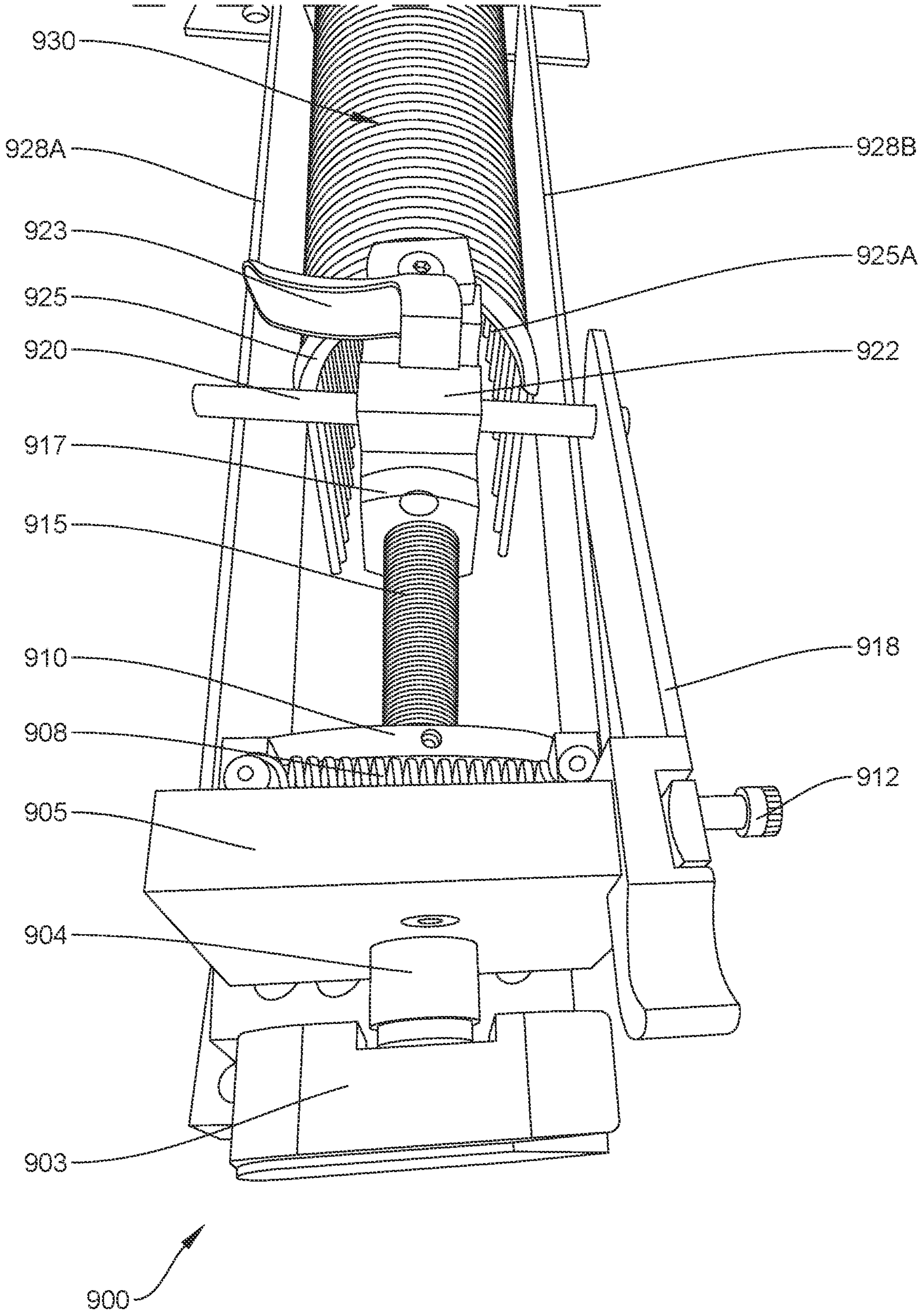
Figure 56:
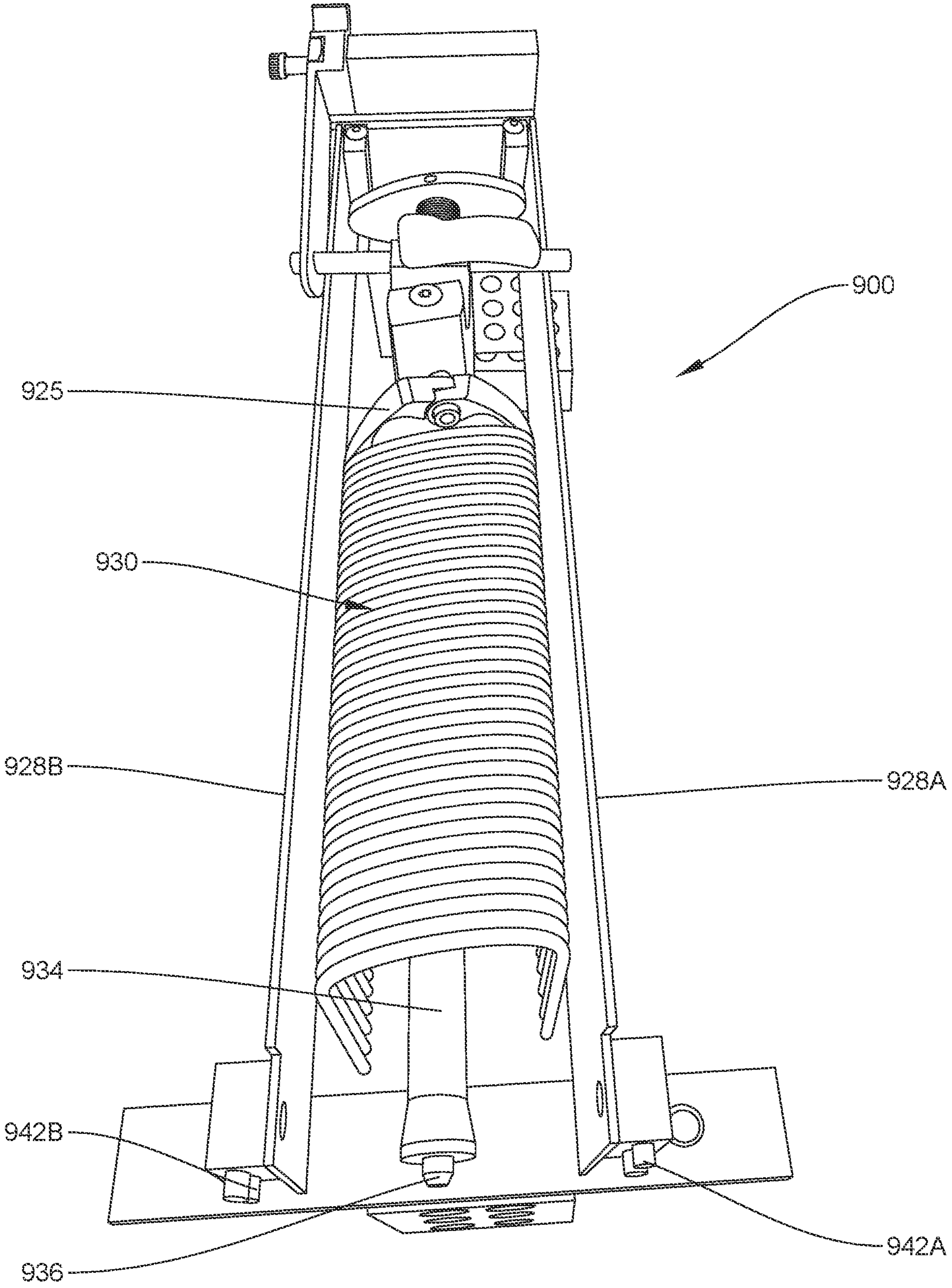
Figure 57:
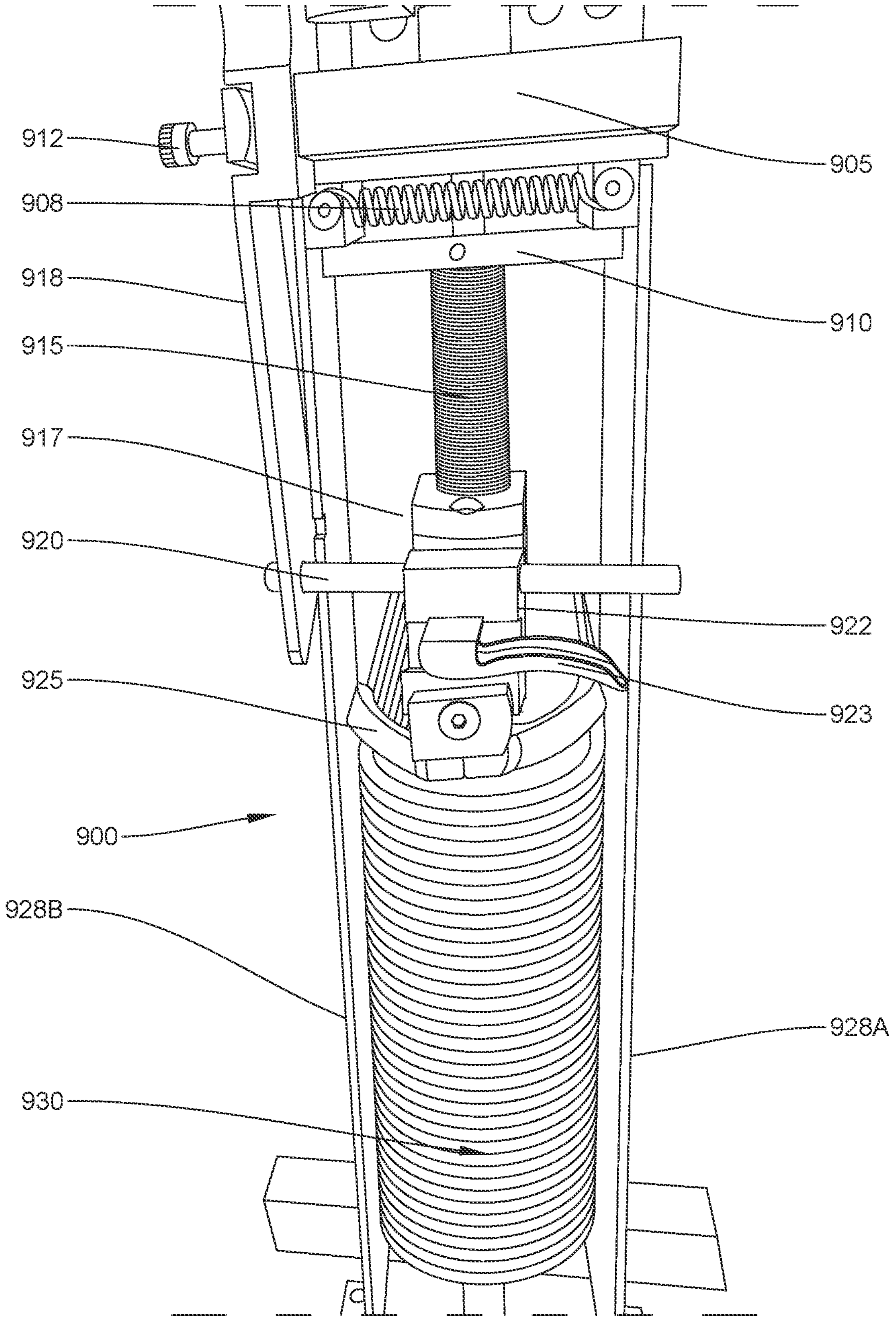
Figure 58:
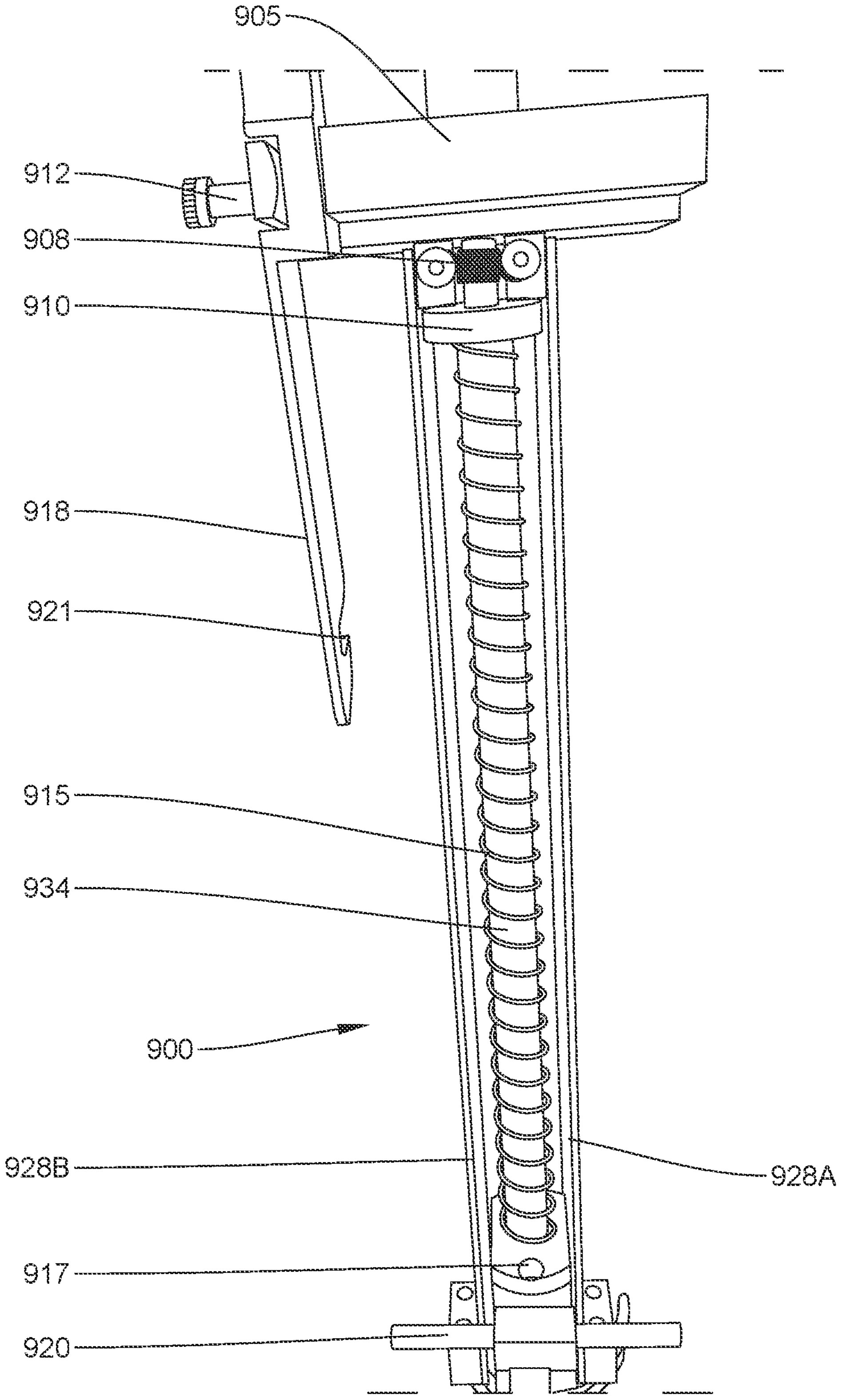
Figure 59:
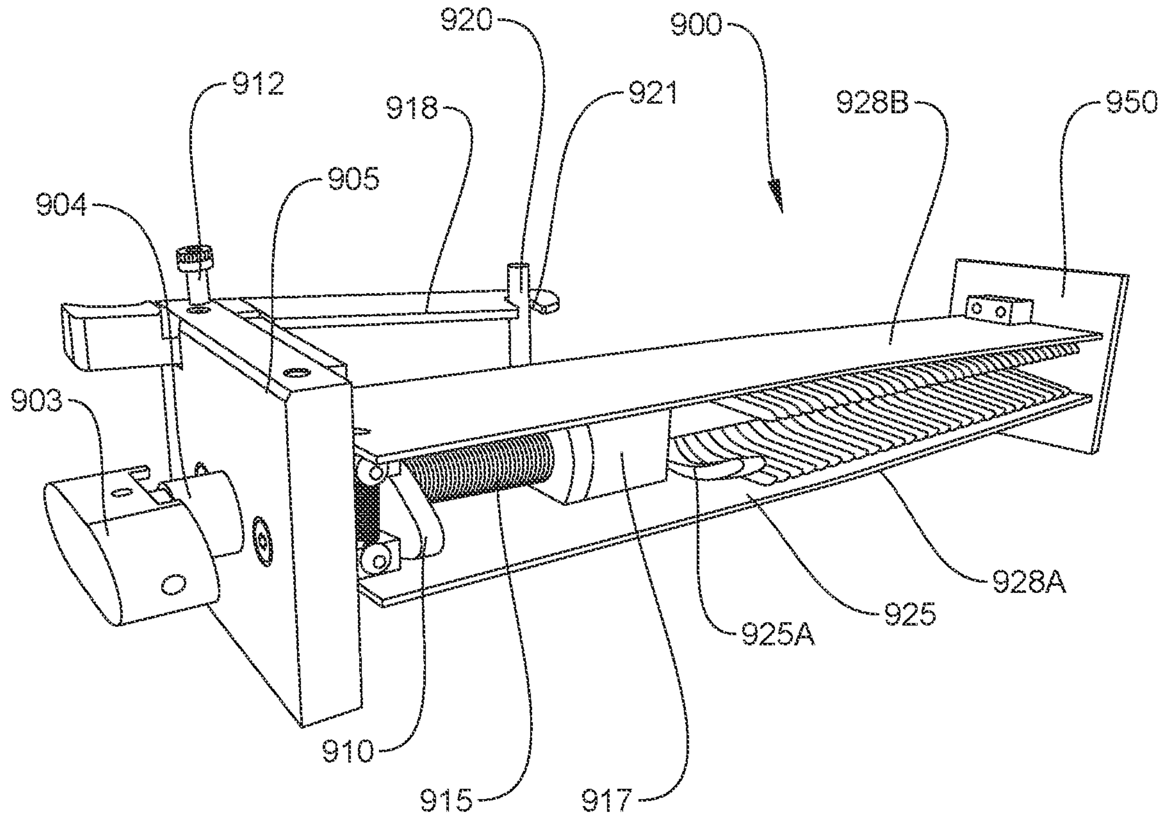

FIGS. 42-46 show a partially assembled replaceable head implementation 700X including arm members 705XA and 705XB which terminate at jaws 711XA and 711XB. Disposed in between arm members is partially formed channel 706X that can receive hammer 808 driven by shaft 805. FIGS. 45-46 show each jaw 711XA and 711XB has two channels offset from each other running in parallel: channel 734A begins inside jaw member 711XA and continues as channel 734B inside jaw member 711XB, while channel 732B begins inside jaw member 711XB and continues inside jaw member 711XA as channel 732A. Channel portions 734A and 732B each begin on side of arms defining partially formed channel 706X and have curved portion which extends inside jaw members 711XA and 711XB. FIGS. 47-48B show arm 705XB in isolation to show what happens to staple or tie during use. One side of tie 40, held at an offset angle and pushed with force by hammer, travels through channel 732B inside arm 705XB, as shown in FIG. 47 and FIG. 48A. When tie 40 enters curved portion of channel 732B (shown in FIG. 48B), it is forced to bend as it reaches the end of channel 732A on opposite arm (not shown), causing straight portion of tie to bend as a result of the mechanical force applied by hammer 808. The same process happens to the other end of tie at opposite arm 705XA. Because the tie 40 is held at an offset angle by hammer 808, as shown in FIGS. 38-40, the ends of the tie are able to enter the offset channels within the arms 705XA and 705XB of the replaceable head. The end result is that the tie 40 is mechanically bent to form a spiral, as shown in FIG. 49A, that forms around rebar members 2 to form a joint, as shown in FIG. 49B. The use of multiple ties around rebar members 2 is also possible to strengthen the joint. FIGS. 50-53B show a U-shaped or horseshoe-shaped tie implementation designed for use with the staple gun. As shown in FIGS. 51A and 51B, the tie has an inner edge shaped like a U and an outer edge that curves inward at the end like a horseshoe. The tie 40 is specifically designed to move through the channels of the arms, having outer curved portions 60 and 80 at the ends of the tie which engage the channels. Inner straight portions 65, 85 run on the opposite side of curved portions 60, 80, terminating where curved portions meet straight portions at the ends of the tie 40. The curved portions 60 and 80 keep the ends of the tie from catching inside the offset grooves, reducing friction between the tie surface and channel surface and allowing tie to move smoothly within the offset grooves when pushed by hammer.

The replaceable heads 700, 700X can be used in conjunction with a magazine or track designed to hold the staples or ties. The track can be spring-loaded to produce constant pressure on the ties to advance them toward tie opening 715 of replaceable head 700, 700X. The track can also be adjustable to accommodate the widths of different sized staples. One implementation of such a track is shown in FIGS. 54-61. Track 900 includes a frame which includes an endplate 905 at a first end attached to two sides 928A and 928B. A knob 903 is disposed at first end of track in communication with a projection 904 on one side of plate 905. On the opposing side of endplate 905, a spring 908 spanning either side 928A and 928B of plate provides tension pulling the two sides together. Adjacent to spring 908 is oblong piece 910, which is rotatable by clockwise or counterclockwise turning of knob 903. An axial spring 915, shown in a compressed position in FIGS. 54-57 and in an extended position in FIG. 58, surrounds an axial shaft 934. Axial spring 915 terminates at end of lower block 917 surrounding shaft 934. A locking mechanism which includes a horizontal bar 920, a lateral arm 918 having a groove 921 in which horizontal bar 920 is disposed when in a locked position, and a pivot 912 allowing for raising or lowering lateral arm 918, is also shown. Horizontal bar 920 traverses through upper block 922 in communication with and disposed over lower block 917. Handle 923 on upper block allows a user to push lower block 917 axially toward first end of track to fully contract axial spring 915 and lock assembly in place by engagement of horizontal bar 920 in slot 921 of lateral arm 918. This compresses the axial spring 915 and locks it in place and allows remaining portion of shaft 934 to be loaded with a stack of U-shaped staples 930 in front of compressed spring 915. Adjacent to blocks 917 and 922 on opposing side of spring is U-shaped or horseshoe-shaped member 925, which is designed to push outward toward sides 928A, 928B of track 900. Horseshoe-shaped member 925 can include two arms on a hinge which are designed to push apart or come together, through mechanisms which can include a curved wire 925A disposed underneath and attached to the arms and providing outward pressure on the arms. Arms of horseshoe-shaped member 925 can move freely as shown or can be attached to track sides 928A, 928B in other implementations. Horseshoe-shaped member 925 makes direct contact with the last staple or tie in the stack 930 and also keeps sides 928A, 928B from touching staples 930 so that they move freely in track 900.

Figure 60:
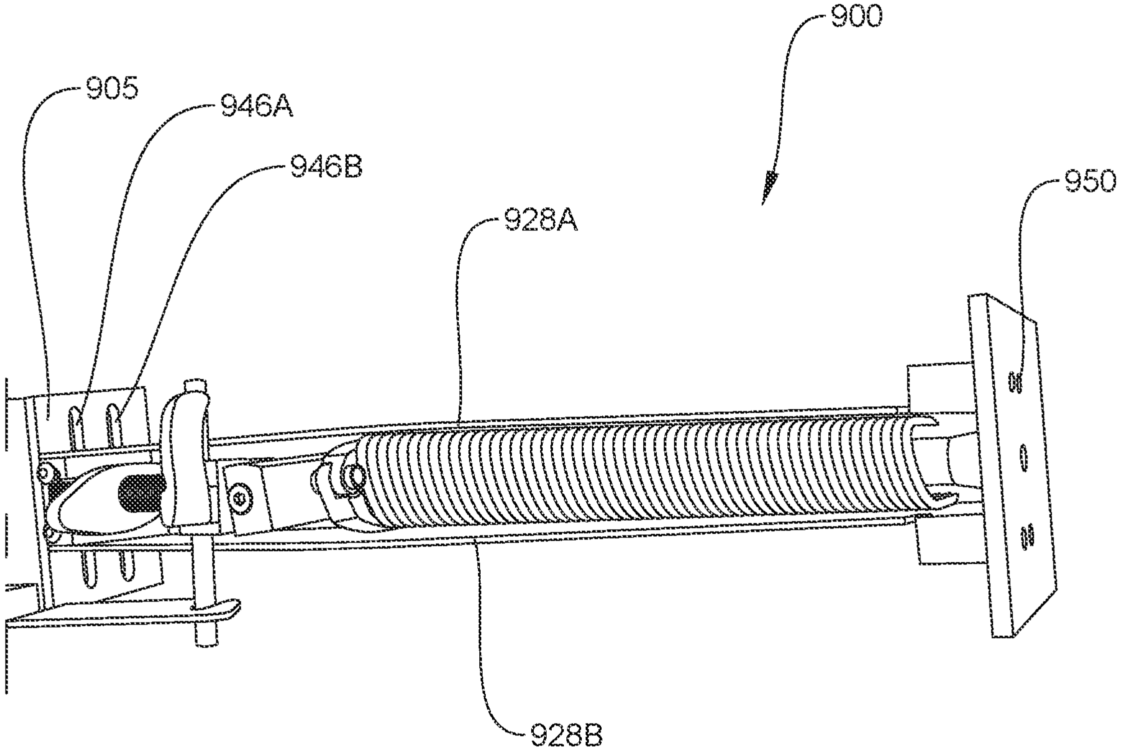
Figure 61:
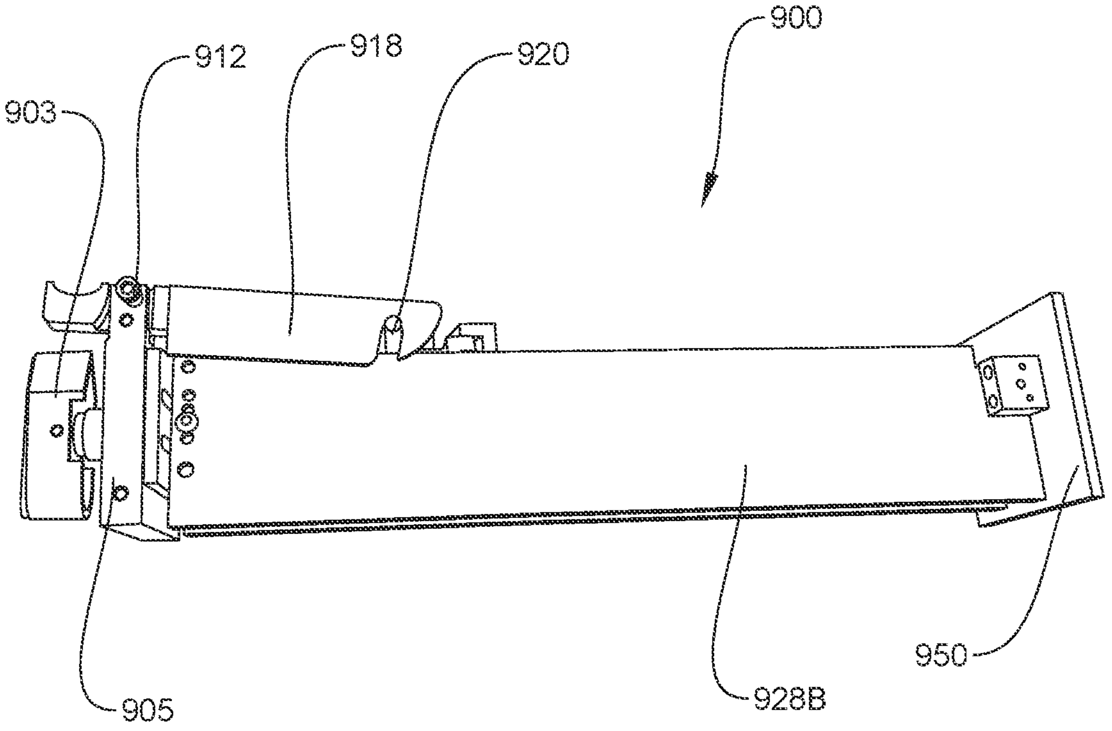

Rotating oblong member 910 by turning handle 903 clockwise or counterclockwise causes sides 928A, 928B to move together or apart, depending on whether length of oblong member 910 is disposed horizontally, vertically, or at an angle. As shown in FIG. 60, tracks 946A, 946B on endplate 905 facilitate adjustment of width of frame of track 900, allowing sides 928A, 928B to move to come closer together or further apart. An opposing plate 950 completes the frame of the track 900 at a second end of the track, shown in FIGS. 59-61. The track 900 connects to opposing plate 950 through projections 942A, 942B on sides 928A, 928B of track 900 and projection 936 at end of axial shaft 934, shown in FIG. 56. Opposing plate 950 can have an opening (not shown) that aligns with opening 715 on adjustable head 700, 700X to feed staples to adjustable head based on constant pressure of axial spring 915 forcing staples outward.

Components of the replaceable head 700, 700X, shaft 805, hammer 808, or adjustable track 900 can be fabricated from sheet metal using various techniques in the metal working arts such as Computer Numerical Control (CNC) milling, or through other metal working techniques such as casting.

The replaceable head 700, 700X, shaft 805, hammer 808, and adjustable track 900 can be assembled together as components of a staple gun having functionality for tying rebar joints together. The shaft can be driven by an actuator on the staple gun that is connected to the shaft and can be activated either through a trigger mechanism or through downward pressure on top of a rebar joint. The actuator can be powered through a battery or through standard AC or DC electrical current. The adjustable track advances staples through the U-shaped staple opening 715 of the replaceable head 700 into hollow channel 706, 706X. The user positions the staple gun over the rebar joint in a manner where the rebar pieces to be joined are positioned between the jaws 705A, 705B (or 705XA, 705XB) of the replaceable head. The user activates the actuator (through the trigger or downward pressure) such that it forces the shaft downward and drives the hammer into hollow channel 706, 706X and grabs the staple 40 at an offset angle. The hammer also makes direct contact with arm portions of the replaceable head inside hollow channel 706, 706X, driving a wedge therebetween to cause arm portions to rotate around a pivot such that jaw portions close around rebar members. The downward force pushes the staple through offset channels or grooves in the jaw portions of the arms of the replaceable head 700, 700X. The offset angle of the staple held by the hammer allows each side of the staple to enter either offset channel or groove on the jaw portions. The staple has an outer curved portion on either end that allows the staple to transit through the channels or grooves with reduced friction. The combination of mechanical force provided by the hammer and curvature in the channels of the jaw portions bends the staple such that it forms a spiral knot surrounding the pieces of rebar, thereby fastening a rebar joint. The straight portions of the U-shaped staples can be mechanically bent when they are pushed into curved portions of the offset grooves of the arms by force provided by the hammer. As such, the hammer and the two arms are designed to work cooperatively to apply mechanical force to the U-shaped staple and bend the U-shaped staple into a spiral-shaped knot surrounding two pieces of rebar to fasten a rebar joint. The knot is fastening this way without the use of rollers as components of the staple gun or its replaceable head. The user can repeat the process to strengthen the rebar joint with additional staples. The head is replaceable and the track is adjustable to accommodate different sized staples.

It should be understood that the various examples of the apparatus(es) disclosed herein may include any of the components, features, and functionalities of any of the other examples of the apparatus(es) disclosed herein in any feasible combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

I claim:

1. An adjustable track for holding staples, comprising:

a frame comprising an endplate and first and second sides attached to the endplate;

an axial shaft extending from the endplate and between the first and second sides;

an axial spring surrounding the axial shaft;

a first mechanism designed to adjust the distance between the first and second sides, the first mechanism comprising:

an oblong piece disposed around the axial shaft and in contact with the first and second sides of the frame and designed to rotate and push the first and second sides apart at a distance based upon the orientation of the oblong piece;

track members running horizontally on a side of the endplate that receive the first and second sides in a manner where the first and second sides are moveable along the track members;

a second mechanism designed to lock the axial spring in place in a compressed position or unlock the axial spring in an extended position, the second mechanism comprising:

a bar disposed laterally across and above a width of the track;

a block in communication with the bar and surrounding the axial shaft adjacent to an end of the axial spring and moveable along the axial shaft length;

a lateral arm disposed on the first or second side of the track having a groove designed to hold the bar when locked; and a pivot allowing the lateral arm to partially rotate therearound such that the arm can be lowered to engage the bar when locked and raised to disengage the arm when unlocked.

2. The adjustable track of claim 1, further comprising:

a first tension member attached to the first and second sides and spanning the distance therebetween, the first tension member having a force pulling the first side and second sides together;

a second tension member having a force pushing the first and second sides apart.

3. The adjustable track of claim 2, wherein the first tension member is a spring.

4. The adjustable track of claim 2, wherein the second tension member is a horseshoe-shaped member comprising first and second arms and having a curved wire underneath exerting pressure pushing the first and second arms away from each other.

5. An adjustable track designed to hold a set of U-shaped staples, the track comprising:

a frame comprising an endplate and first and second sides attached to the endplate;

an axial shaft extending from the endplate and between the first and second sides;

an axial spring surrounding the axial shaft;

a first mechanism designed to adjust the distance between the first and second sides;

a second mechanism designed to lock the axial spring in place in a compressed position or unlock the axial spring in an extended position; and a horseshoe-shaped member comprising first and second arms and having a curved wire underneath exerting pressure pushing the first and second arms away from each other to cause a first and second side of the frame to have a distance therebetween exceeding a width of the width of the U-shaped staples.

* * * * *